(12) United States Patent
Koshiyama et al.

(10) Patent No.: US 8,356,488 B2
(45) Date of Patent: Jan. 22, 2013

(54) METHOD OF PRODUCING METAL PLATE TYPE WATER, A METAL PLATE TYPE WATER PRODUCTION APPARATUS, A WATER COLLECTION METAL PLATE, AND A WATER COLLECTION METAL ELEMENT

(76) Inventors: Hideya Koshiyama, Ibaraki (JP); Takuya Koshiyama, Ibaraki (JP)

( * ) Notice: Subject to any disclaimer, the term of this patent is extended or adjusted under 35 U.S.C. 154(b) by 737 days.

(21) Appl. No.: 12/374,852

(22) PCT Filed: Jul. 24, 2007

(86) PCT No.: PCT/JP2007/065027
§ 371 (c)(1),
(2), (4) Date: Nov. 16, 2009

(87) PCT Pub. No.: WO2008/013306
PCT Pub. Date: Jan. 31, 2008

(65) Prior Publication Data
US 2010/0071388 A1   Mar. 25, 2010

(30) Foreign Application Priority Data

Jul. 25, 2006  (JP) ................................. 2006-201835
Dec. 8, 2006  (JP) ................................. 2006-331295

(51) Int. Cl.
*F25D 17/06* (2006.01)
(52) U.S. Cl. ............................................. 62/92; 62/272
(58) Field of Classification Search .................... 62/272, 62/92, 285, 291, 288; 210/669, 754
See application file for complete search history.

(56) References Cited

U.S. PATENT DOCUMENTS

| 2,996,897 | A |   | 8/1961 | Grimes |
| 3,710,450 | A | * | 1/1973 | Figiel ............................... 34/337 |
| 6,745,590 | B1 | * | 6/2004 | Johnson et al. .................. 62/272 |
| 7,000,419 | B1 | * | 2/2006 | Ohmi et al. ..................... 62/282 |
| 2004/0109981 | A1 |   | 6/2004 | Lawrence et al. |
| 2006/0065002 | A1 | * | 3/2006 | Seoane .......................... 62/291 |

FOREIGN PATENT DOCUMENTS

| JP | 01-260233 | 10/1969 |
| JP | 06-073808 | 3/1994 |
| JP | 07-250578 | 10/1995 |
| JP | 08-158699 | 6/1996 |
| JP | 2004-530066 | 9/2004 |
| JP | 2006-009483 | 1/2006 |
| JP | 2006-153478 | 6/2006 |

* cited by examiner

*Primary Examiner* — Mohammad Ali
(74) *Attorney, Agent, or Firm* — Antonelli, Terry, Stout & Kraus, LLP.

(57) ABSTRACT

By cooling a metal plate, a water film is generated on a surface of the metal plate due to dew condensation, in a linear increase amount process and at before stage of saturation, the generation water is flipped off, and the generation water film is peeled off forcibly from the metal plate and water collection is carried out. It provides the metal plate, a cooler for cooling the metal plate, and a water film peeling-off mechanism for flipping off forcibly and peeling off forcibly the water film generated on the surface of the metal plate. A water collection metal plate wherein with the metal plate having the surface in which an effective surface of after processing is enlarged to a surface area before processing, the water film is generated to the surface of the metal plate by dew condensing moisture in atmosphere, the generation water film is flipped off forcibly and peeling off from the metal plate, thereby the water collection is carried out.

17 Claims, 14 Drawing Sheets

Fig. 13

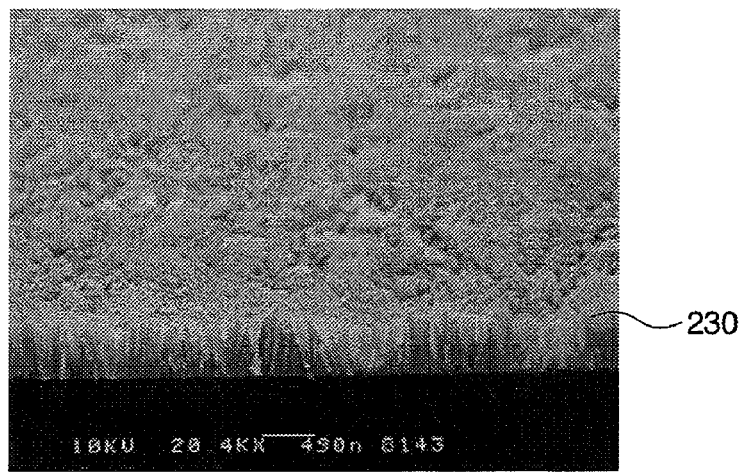

| process 1 | SUS plate supply |
| --- | --- |
| | automatic supply robot |

| process 2 | roughness before-processing |
| --- | --- |
| | 0.1-1.0 particle injection |

| process 3 | roughness after-processing |
| --- | --- |
| | 0.01-0.1 particle injection |

| process 4 | roughness after-processing |
| --- | --- |
| | roughness of crystal level |

| process 5 | TiO₂ sol spraying |
| --- | --- |

| process 6 | heat and dry |
| --- | --- |
| | TiO₂ grazing·thin film deposition |

| process 7 | gradual cooling & abrupt cooling |
| --- | --- |
| | warm water / cool water shower |

| process 8 | quality control |
| --- | --- |
| | effective surface area & hydrophilic degree |

| process 9 | complete product discharge |
| --- | --- |
| | quality sheet pasting & stacking robot |

METHOD OF PRODUCING METAL PLATE TYPE WATER, A METAL PLATE TYPE WATER PRODUCTION APPARATUS, A WATER COLLECTION METAL PLATE, AND A WATER COLLECTION METAL ELEMENT

TECHNICAL FIELD

The present invention relates to a method of producing metal plate type water and a metal plate type water production apparatus, in particular a method for producing metal plate type water and a metal plate type water production apparatus comprising a metal plate having a cooler for extracting water from moisture in atmosphere and a water film peeling-off mechanism for peeling off forcibly a water film generated in a surface of the metal plate.

The present invention relates a water collection metal plate and a water collection metal element, in particular to a water collection metal plate which reforms to a surface to be wetted easily in a water collection property and a manufacture method thereof, using the water collection metal plate a method for constituting a water collection element which becomes as a water collection element for collecting easily water from moisture in atmosphere, and various kinds use method relating to the water collection metal plate and the water collection metal plate element.

BACKGROUND TECHNIQUE

Water is a source of life of an earth living thing. On the other hand, in each earth areas a drying performance and a deserting performance proceed according to an earth environment warming phenomena. There exists an area where water has a higher cost than oil. The present invention relates to a method for producing metal plate type water in which water is extracted from moisture in atmosphere being a material of the water and a metal plate type water production apparatus. The metal plate type water production method and the metal plate water production apparatus of the present invention can provide a manufacture group adapted suitably to the various places where water is necessary and the services.

A metal plate (a metal plate) dislikes water in generally. As a result, up to now to obstruct the harms due to the wetness and the stain of a surface of the metal plate the various technical means have studied and put to practical use. The technique for aiming the metal plate type water production method and the metal plate water production apparatus of the present invention resides a large mount water collection from moisture in atmosphere by reforming the surface of the metal plate and therefore this is a reverse idea so far. For the present time, there exists no similar technique and no product for collecting water from moisture in atmosphere.

DISCLOSURE OF INVENTION

The problem to be solved by the present invention relates to a technique of a metal plate type water production method and a metal plate water production apparatus for extracting a necessity amount water from a free source, the atmosphere being a material and moisture thereof is free.

A principle of water production technique is a universal natural phenomenon where water dew on a surface of the material by cooling the material. By utilizing this natural phenomenon, it is a problem for requiring a means for maximizing the water production amount to be of the greatest efficiency.

The main techniques for increasing the water production amount are following two points. One point is that generation time of water film for condensing to a surface of a cooled metal plate is early and much water amount Is obtained. For these, it can be solved the problem according to a surface roughing a surface of a metal plate by reforming a hydrophilic property and/or performing a covering film of a hydrophilic property.

Another point, when a thickness of the water film generated on the surface of the cooled metal plate exceeds over a predetermined amount, since an increase water is obstructed, in a linear increase amount process (an abrupt increase process) or during before-process of saturation in which the increase amount becomes to get dull, the generation water film is wiped off or flipped off by a water film peeling-off mechanism, then the generation water film is peeled off forcibly from the surface of the metal plate. According to an operation of this water film peeling-off mechanism, it has became clear by experiments that, under a normal temperature and a normal humidity, the increase amount effect is more than about 2,000 times per month and more than about 1,000 times under a low humidity degree (30%) at a desert area etc.

The essential point of the present invention resides in that, in a water production method for extracting water from moisture in atmosphere, a metal plate water production method is, by cooling a metal plate, a water film is generated on the surface of the metal plate through the dew condensation, at a linear increase amount process before a pre-stage time point the generation water film is flipped off, and the generation water film is peeled off forcibly from the metal plate and collected.

The essential point of the present invention resides in that, in a water production apparatus for extracting water from moisture in atmosphere, a metal plate type water production apparatus comprises a metal plate, a cooling means for cooing the metal plate, and a water film peeling-off mechanism for peeling off forcibly by flipping off a water film which generates on a surface of the metal plate.

A main constitution elementary technique for the metal plate type water production method for extracting water from moisture in atmosphere and the metal plate type water production apparatus will be recited as followings.

(1) A metal plate reformed to have a hydrophilic property to a surface for extracting effectively water.

(2) A cooling means for cooling the metal plate.

(3) A water film peeling-off mechanism for wiping off or flipping off a generation water film to the surface of the metal plate (a wiper, a ultra sonic oscillating mechanism, etc.).

(4) A motor for operating the wiper, a ultra sonic vibrator for operating the ultra sonic oscillating unit.

(5) An atmospheric phenomenon sensor for measuring an atmospheric phenomenon data for accumulating a prearranged water production amount.

(6) A control means for controlling a whole apparatus for producing a maximum amount water production under a given atmospheric phenomenon and receiving indication information from a user.

(7) A water level sensor for watching a water level of the generation water.

(8) A water sending means for sending the generation water.

(9) A main body and a case provided on a water reservation tank etc.

(10) A power source motive power for using together or using singly, such as a sunlight generation means, a wind power generation means, a commercial electric power.

According to the metal plate type water production method and the metal plate type water production apparatus of the present invention, by cooling the metal plate reformed the surface by performing the hydrophilic property covering film by the cooling means, by producing effectively the moisture in atmosphere the water film is generated and at the time of the linear increase amount process of the water film generated on the surface of the metal plate and the immediately before the water increase obstruction phenomenon (the saturation state) by the thickness of the generation water film, the generation water is peeled off forcibly from the metal plate where the generation water film is wiped off by the wiper or flipped off by the ultra sonic vibrator and so on, thereby it is possible to produce the much large water etc. For example, the increase amount effect only by the wiper becomes about 1,000 times per month under the environment of the low humidity degree (30% degree) in comparison with the non-processed metal plate using no wiper.

It is possible to constitute the power source motive power of the metal plate type water production method and the metal plate type water production apparatus of the present invention with the together use or the single use of the sunlight power generation, the wind power generation and the commercial power source according to the demand. By utilizing the natural energy, it is possible to make no charge a running cost similar to the atmosphere being the water source of the metal plate type water production method and the metal plate type water production apparatus of the present invention.

Since the general water taking-in means requires large funds for preparing the water source, the power source and the water sending infarction, it is hardly to practice by an individual person level. According to the metal plate type water production method and the metal plate type water production apparatus of the present invention, it is possible to take-in the necessary water amount at the place where no infraction exists such as the desert, the separated island, and the mount area. It may safely be said the oasis of the desert where the water is possible to transported by the truck.

The main use of the water collection metal plate and the water collection metal element being the easy wet water collection system of the present invention are "metal plate type water production apparatus" for collecting the large amount water from the atmosphere, "building cooling apparatus" for cooling a whole of the building, "humidifying and dehumidifying apparatus having the humidity apparatus and the dehumidify apparatus and having both functions" for controlling the humidity of the room air, and "roof snow removal apparatus" for removing automatically the snow on the roof. Since these apparatuses hardly are required the energy such the electric power and the fuel, it may safely to said as the future indicating environment apparatus. The present invention relates to provide the industrial material being the main element with these apparatuses.

The problem to be solved by the present invention is the manufacture method for reforming the water collection metal plate to be the surface having the superior easy wet collection performance and the use manner of the water collection system element of the present invention with the respective apparatuses shown in the above stated items and hereinafter it will be explained in followings.

As one item, it performs the roughness performance of the metal plate surface. For obtaining the easy wet high water collection performance, the necessary condition is the maximization of the valid surface area per the unit effective area of the metal plate surface. For this, it is necessary to process the roughness performance of the metal plate surface.

As a second item, it performs the surface reformation to obtain the metal plate having the high water collection performance. It is necessary to generate the hydrophilic property material crystal at the adhesion condition to the metal crystallization under the enforcement condition for generating the high water collection of the hydrophilic property material such as oxide titanium ($TiO_2$) or oxide silicon ($SiO_2$). To adhere the crystals together these two materials, it is necessary to carry out the roughness performance process to the metal crystal face.

As a three item, it is the attenuation prevention of the high water collection degree of the metal plate. In the crystallization of the hydrophilic property material of the above second item, it is the performance under the high temperature and the high heating, but the abrupt cooling attenuates the hydrophilic property degree. As a result, to fix the hydrophilic property degree, it is important the time process for lowering the temperature area from the high temperature to the normal temperature.

As a fourth item, it is the quality control of the metal plate. To continue the production under the stable quality, it is necessary to provide to the user the article which has performed the quality estimation of the roughness condition of the hydrophilic property degree of the subjective face of the manufacture article and it is necessary to produce the water collection metal plate using the production equipment having the automatic control function.

The above is the problem about the manufacture method of the water collection metal plate of the present invention. Successively, it will be explained the problem about the use manner of the water collection system element.

The problem about the water production apparatus: According to the united nation white paper, the world population worried by the water insufficiency is about nine hundred million at the present time, and it will be estimated to be forty hundred million at about 2075 year. The nature fierceness will rob the life from the peoples. Water is dispensable for the living. In future, since the already known water source decreases, it will require strongly the water taking-in method which does not depend on the already known water source. The present invention relates to provide the water production apparatus as a means for requiring the moisture in atmosphere and collecting the much amount water at a low cost and at a cheap price.

Seawater desalination plant: There is the seawater desalination plant for obtaining the large amount water as the already known water taking-in method, however this has following demerits. It will be introduced at the large city near to the sea and having the large funds, however it will not be received the benefit at the depopulated area from the cost against effect aspect. As a result, the peoples who are unable to make the life and leave the village and make the champ around the city and this become the generation source of the various problems.

The problem about the building cooling apparatus: This is an international problem and this relates to the electric power saving being the promise of Kyoto agreement. The large electric power consumption is the summer time cooling electric power. It requires a means which does not depend on the cooling using the electric power. The present invention is to provide the building cooling apparatus having a high performance and a low cost as a means for cooling a whole building by applying the evaporation heat being the natural phenomenon.

The problem about the room humidifying apparatus: The present building equips the air conditioning apparatus however it have hardy the humidifying function, thereby room air presents the dry condition through year. Accordingly, to attain the comfortable space it is necessary to add the humidity. At the present time, the small space use humidifying apparatus is putted on the market, however no large space use humidifying apparatus exists. Since it increases many peoples who are unbearable in the dry space at the long time, it requires the large space use humidifying apparatus. The present invention relates to provide the humidifying apparatus having the high performance at the low cost.

The problem about the room humidifying and dehumidifying apparatus: The air in the underground room and the tunnel is damp. To the person who works in this space and in the installation of the apparatuses being weak against the humidity, it requires the humidification and the dehumidification. It is possible to supply the market air conditioning apparatus, however it is hardy satisfy the effect against cost. Accordingly, to satisfy from this aspect it requires the humidifying and dehumidifying apparatus having the low price. The present invention relates to provide the humidifying and dehumidifying apparatus having the high performance at the low cost.

The problem about the room humidifying and dehumidification apparatus: To maintain the comfortable room space, it requires the humidifying and dehumidifying apparatus for satisfying the humidification and the dehumidification through year, however there is no market article. It can be solved by the apparatus, which satisfies both of the above stated humidifying apparatus and the above stated dehumidifying apparatus.

The problem about the roof snow removal apparatus: The aim is to remove automatically the roof snow by no electric power use. The death and injury accident due to the fall-down during the snow takedown working in the heavy snow area occurs frequently. In future, it can expect that according to the affect of the earth warming the sea water temperature in Japan sea arises and the large amount vapors generate and the large snowfall becomes. It requires the means for snow take-downing at safety and at low price. At the present time, the snow takedown use apparatus is put on the market, however these apparatuses have the defects in the design, the treatment performance, the introduction cost, the running cost, the noise and a result it obstructs the propagation. The present invention relates to the room snow removal apparatus in which the above stated defects can be dissolved.

The summary of the present invention with the above stated problems and the effects will be explained as followings.

The essential point of the present invention resides the metal plate having the minute surface in which the effective surface area after the processing is enlarged with the surface area before the processing, and the water film is generated by making the dewdrops of the moisture in atmosphere on the surface of the metal plate, the generation water film is flipped off and the water film is peeled off forcibly and is collected.

The roughness performance of the metal plate surface: For reform the metal surface of the metal plate to the water collection performance, the necessary condition is the surface roughness performance for maximizing the effect area of the metal plate surface. As the condition of the roughness surface, it is necessary to carry out the roughness performance enforcement for making n times with the surface area before the processing. It is desirable to be more than n=3 times. The roughness performance metal plate can be used as the components for improving aspects from the water-cut performance and the sanitary performance for the home appliance products and the miscellaneous goods.

The high water collection performance surface reformation of the metal plate: It is the processing for reforming the metal surface by solid fixing the different material, which has the hydrophilic property material with the metal surface of the metal plate. In this processing, the enforcement management is important. In the management contents, the hydrophilic property material is powder body size, and it is made less than about $1/100$ with the roughness area of the metal plate, then it can maintain the effective surface area. On the other hand, it is important to crystallize under the enforcement condition for revealing the degree of the hydrophilic property material at maximum and this crystal is combined closely to the metal roughness surface, and to strengthen the combination strength it is necessary to carry out to the metal crystallization the pre-treatment processing using the plasma or the leaser. Further, according to the heating the gradual cooling time is important to maintain the high water collection degree after the crystallization.

By the above stated enforcements, it can realize the water collection metal plate for revealing the easy wet-ability water collection performance, the superior high water collection performance and the high hydrophilicity degree. With this realization, it can realize the high water collection metal plate as the main elementary articles and with the main uses. The respective apparatuses will be explained hereinafter.

About the water production apparatus: This apparatus concerns to provide the life foundation for the peoples in world who want to water. Since the living life will be disappeared without the water, the water is dispensable to ensure the living. It is possible to collect the water even the place where there is no power source and no water source by the electric power for requesting the sunlight and the wind force, thereby it can be said safely that the water production apparatus is the transportable oasis in the desert. The demands are the greening in the desert, the food production service water, the drink water, etc. and it can provide the basis source for consisting the human sociality.

About the building cooling apparatus: As stated in above, this apparatus can apply effectively the evaporation phenomenon of water. It will have the effect in which the consumption during the summer period becomes half by the natural phenomenon. In the city where the building is stood closely, it utilizes to a whole building, a whole town becomes cool, and the customer gathering effect become to heighten.

About the humidifying/dehumidifying apparatus: The home appliance product for the small space use is put the market, however there is the need for the large space use such as the building, the gymnasium etc. but it is not put in the market. The present invention will match to this need. The room humidity as the comfortable space is about 50% degree, it can provide the apparatus for adjusting automatically the humidity.

About the dehumidifying and humidifying apparatus: It can provide the product having both dehumidification and humidification functions and the control means for adjusting automatically to have the most suitable space humidity and can provide the article which hardly necessities the electric power corresponding the large space.

About the roof snow removal apparatus: This apparatus is the most easily product as the easy wet-ability water collection metal plate use. It can use the free power source such as the water collection metal plate and the underground heat and can avoid the freezing. It can provide the roof snow removal apparatus having the zero running cost.

BRIEF EXPLANATION OF DRAWING

FIG. 13 is a squint photography of FIG. 12.

FIG. 14 is a production flow view of a water metal plate element A.

BEST MODE EMBODIMENT FOR CARRYING OUT THE INVENTION

Figure 1:
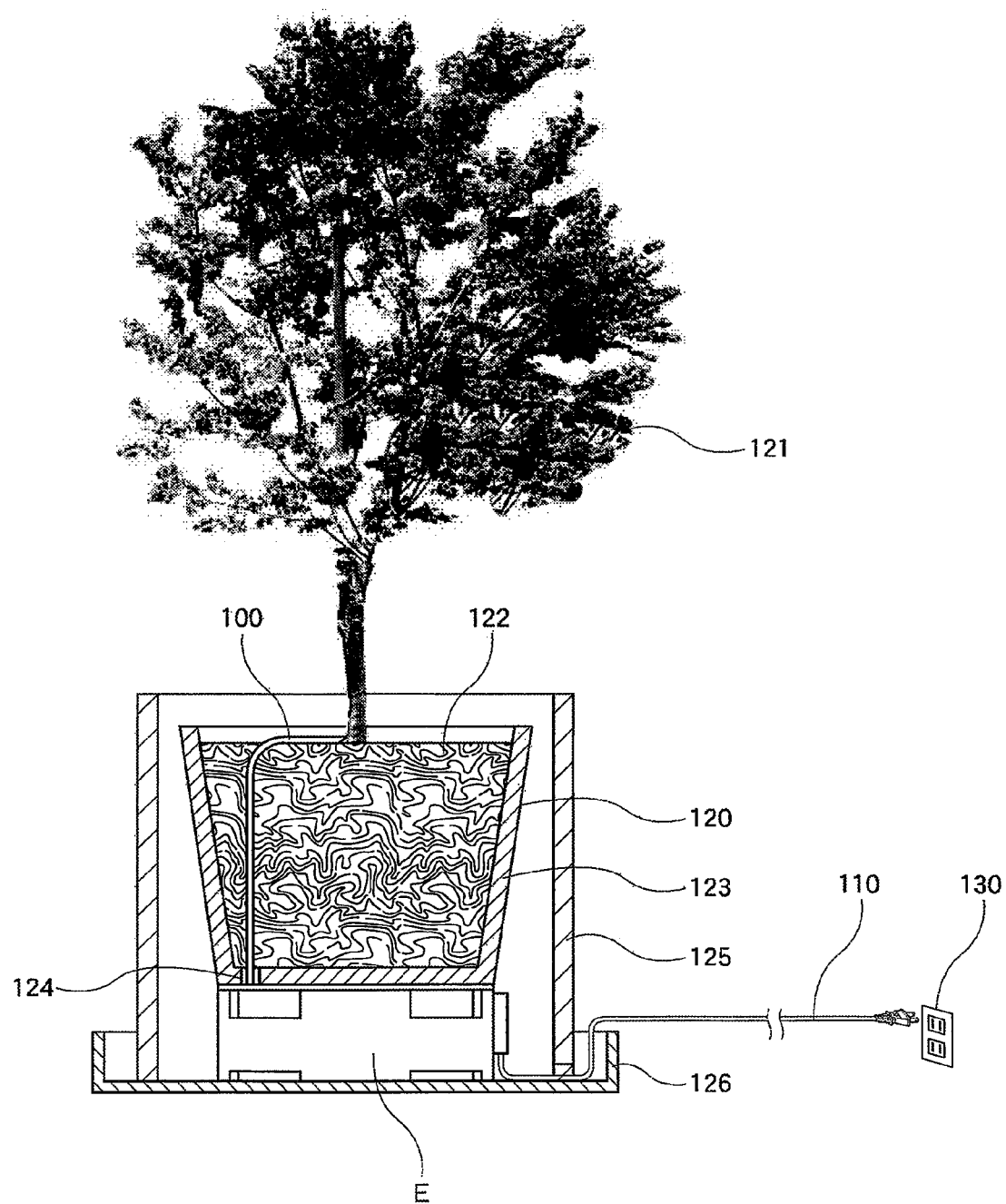
FIG. 1 is a partially cross-sectional view showing a use state of a plant automatic water supply apparatus.

It will explain a mode of a plant automatic water supply apparatus E as one embodiment of a metal plate type water production method and a metal plate type water production apparatus. Further, an example of a case of a metal plate in which a surface of the metal plate is performed with a hydrophilic property covering film, between two aluminum (Al) plates an aluminum (Al) heat plate enclosed a heat medium is adopted, and to carry out a peel-off of a generation water film a wiper for wiping off adhesion water (a generation water film) of a metal plate surface is adopted. This embodiment of the plant automatic water supply apparatus has a main body size of about 20 cm, and a small size cylindrical stand of a height 5 cm.

The main essential constituting elements of the plant automatic water supply apparatus E are a main case 10, a metal plate 30, a gear motor 40, a wiper 50, a cooler 60, a control means 70, a water level sensor 90, and a water introduction tube 100, etc. Further, a power supply in this explanation is a commercial electric power and a sunlight power generating means and a wind power generating means are omitted from this explanation.

The use state of the plant automatic water supply apparatus E will be explained with FIG. 1. In a planter 120 a foliage plant 121 is planted on a soil 22 and a pot 123.

It is desirable to make the pot 123 by a resin manufacture article having a low price and a light-weight structure. In a bottom face of the pot 123, a tube hole 124 for penetrating the water introduction tube 100 has opened in advance. The planter 120 is mounted on the plant automatic water supply apparatus E. For arrange to have the beautiful appearance, an ornament cage 125 and a receiving dish 126 are set. A power supply cord 110 is inserted to a plug receptacle 130 through a lower end of the ornament cage 125.

Figure 3:
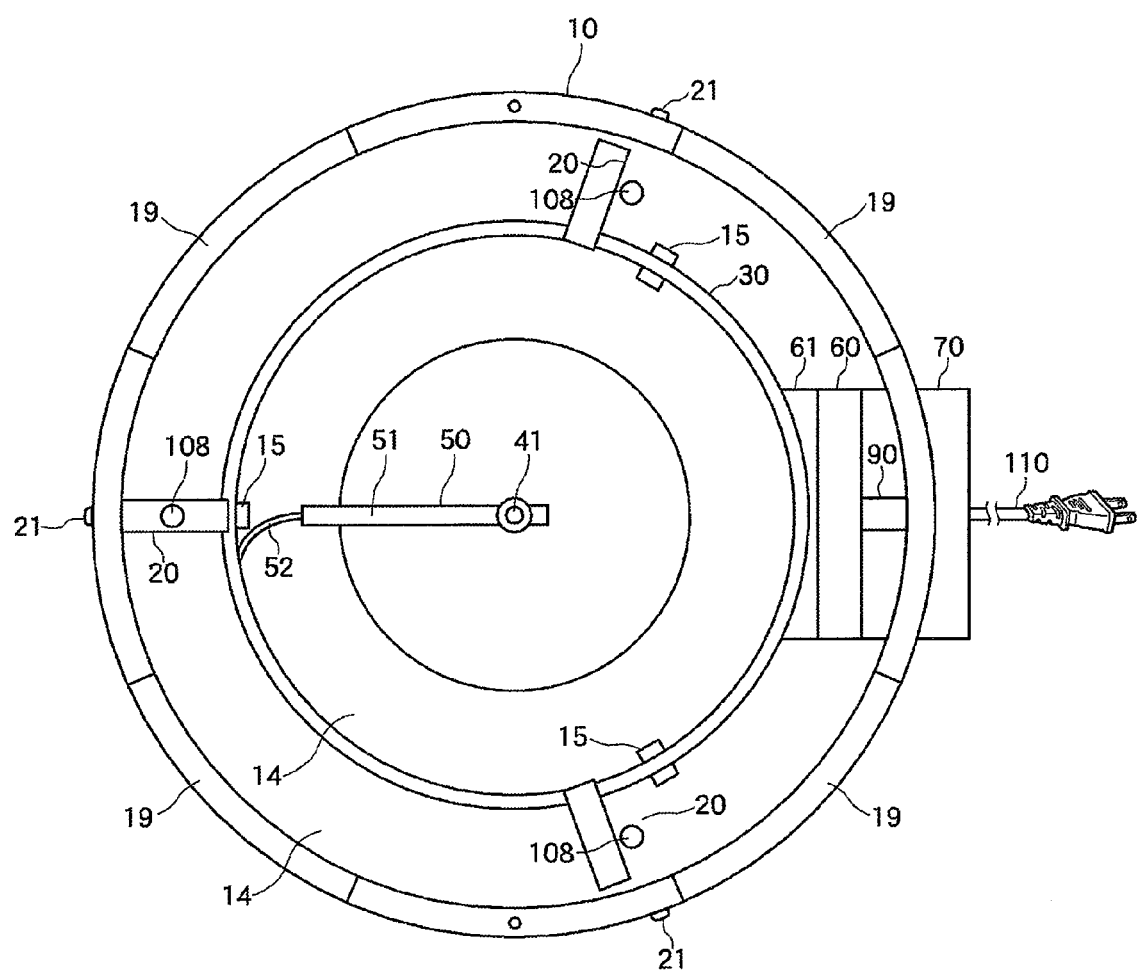
FIG. 3 is an upper face view showing a state in which a cover and a water introduction tube are removed from the plant automatic water supply apparatus.
Figure 4:
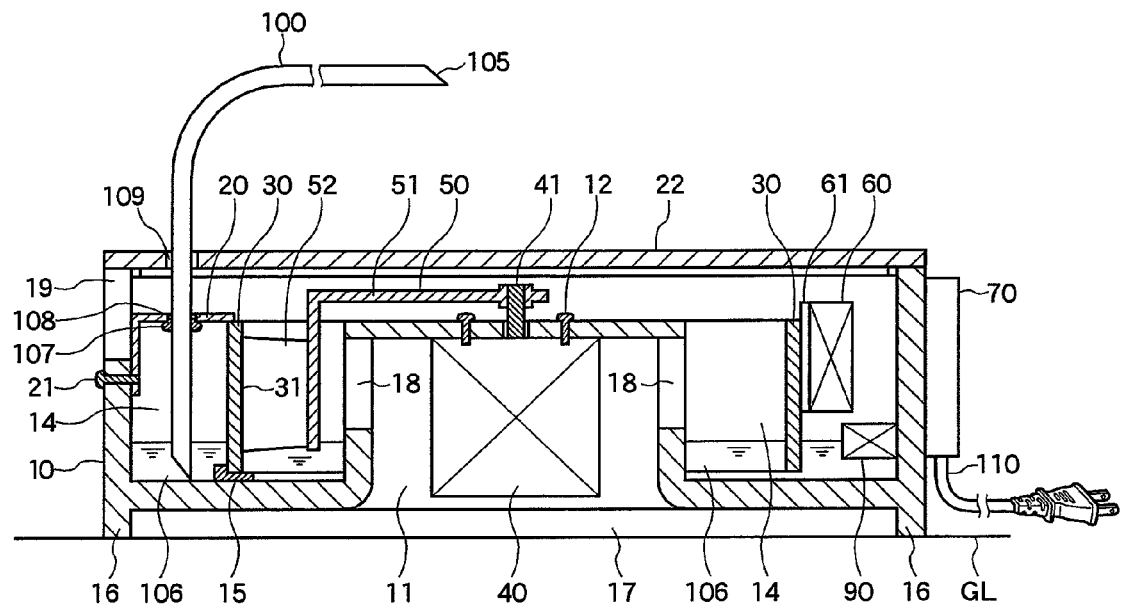
FIG. 4 is a cross-sectional view showing the plant automatic water supply apparatus.

A relationship between the main case 10 and the gear motor 40 will be explained using FIG. 3 and FIG. 4. The main case 10 has a motor room 11 at a central portion and in this motor room the gear motor 40 is stored and is fixed using plural motor screws 12. A rotating shaft 41 of the gear motor 40 is projected from toward an upper portion from a penetrating hole 13 and the wiper 50 is installed.

A specification of the motor gear 40 will be explained. It is desirable to obtain a rotating speed having a low speed about ten seconds per one rotation. The reason is that since the wiper 50 slides to the hydrophilic property covering film of the metal plate 30, it is necessary to attain the wear and tear prevention and the life extension. As a result, to lower the rotational number the motor having the gear is used.

Since the plant automatic water supply apparatus E extracts water from the moisture in atmosphere, the inhalation and the exhaust are important. To provide the inhale port and the exhaust port, plural stands 16 are provided on the plant automatic water supply apparatus E and are floated from a floor surface and an opening 17 is provided. The air entered from the opening 17 reaches to an inflow port 18 and flows into a water reservation room 14. The air entered in the water reservation room 14 is dehumidified by the metal plate 30 and becomes light and moves towards an upper portion and flows out from the outflow port 19. Since the entering and outflow air amount affects to the water production ability, it is important to provide the large areas of the opening 17, the inflow port 18 and the outflow port 19 being the air flow passages as possible.

The metal plate 30 will be explained with FIG. 3 and FIG. 4. In this embodiment, a heat medium having a superior heat conductivity is enclosed between two aluminum (Al) plates and a surface of one aluminum (Al) plate is a hydrophilic property heat plate in which a hydrophilic property covering film is performed. The hydrophilic property covering film is an inner side surface 31 of the metal plate 30 constituted with a ring shape. The heat plate has the superior heat conductivity, it has a characteristic even one point of the heat plate is cooled a whole of the heat plate is cooled.

The installation position of the metal plate 30 is a central portion of the water reservation room 14 of the main case 10, a horizontal direction thereof is fixed by ribs 15 and an upper portion and a lower portion thereof is fixed by plural pressing metal fittings 20. The pressing metal fittings 20 are fixed to a side face of the main case 10 by plural pressing metal fitting fix screws 21.

The wiper 50 will be explained with FIG. 3 and FIG. 4. The wiper 50 is constituted with a wiper arm 51 and a wiper blade 52 enable to attach to a tip end thereof and installed to the rotating shaft 41. The wiper blade 52, as shown in FIG. 4, is installed to the inner side surface 31 of the metal plate 30 with a bend state. The material of the wiper blade 51 is a soft resin sheet having about thickness of 0.15 mm.

The cooler 60 will be explained with FIG. 3 and FIG. 4. Since the plant automatic water supply apparatus E is mainly the planter plant, it is unnecessary to use the large amount water. As a result, a Peltier unit is adopted as the cooler having 20 deg. The cool air of the cooler 60 is transmitted surely to the metal plate 30 through a cool air transmission portion 61. The cool air transmission portion 61 is fixed using a soldering etc.

The control means 70 will be explained with FIG. 2, FIG. 3, FIG. 4 and FIG. 6. The control means 70 is a brain of the plant automatic water supply apparatus E and is an electric system control portion, an information type processing portion and a user operation portion. The related component group is a control unit 71, the gear motor 40, the cooler 60, the water level sensor 90, an atmosphere sensor 91, and a power source cord 110, etc. The main content of the control and information processing is that to obtain proper information from the water level sensor 90 and the atmosphere sensor 91, it is the operation/stop command at the necessary time to the gear motor 40 and is the operation/stop command to the cooler 60 at the most suitable time and is the operation/stop command to the related respective components and a discrimination of the existence of the power supply input power from the power supply cord 110.

The control unit 71 for constituting an electron circuit of the control means 70 comprises of the atmosphere sensor 91 for measuring the humidity and the temperature and a function for estimating a theoretic water production amount from the measured data. Under the measuring method installed in advance, comparing with the given atmosphere data in all time, it has a function for operation continuing by judging itself a most suitable operation relating the water production.

An operation panel 72 is provided on an outer surface of the control means 70. It will be explained with FIG. 6. The operation panel 72 is constituted by a liquid crystal screen 73, an ON/OFF button 78, an increase/decrease button 79 for setting an increase and a decrease of the water amount, a number setting button 81 for setting a water supply number, an electrification light (red color) 82 for confirming an ON/OFF state, an operation light (blue color) 83 for confirming the water production operation state, and a confirmation button 80 for confirming the setting contents, etc.

The electrification light 82 is a display for viewing ON/OFF state. The red color lighting shows the electrification time, a putting-out lighting is no electrification. The operation lighting 83 is a display light for viewing the water production state. The blue color lighting shows the water production operation time, a putting-out lighting shows the water stopping time. Further, it operates during the lighting state (the electrification time) of the electrification light 82 and lights on.

The water level sensor 90 will be explained with FIG. 3 and FIG. 4. An installation place of the sensor is a lower portion of the cooler 60 and positions in the water reservation room 14 and fixes to an inner wall of the main case 10. The role of the sensor monitors the water amount and the water level made by the plant automatic water supply apparatus E and transmits the information to the control unit 71 to have a predetermined amount at all times. The control unit 71 commands the operation/stop of the gear motor 40 and the cooler 60 under this information and burdens the important role.

Figure 5:
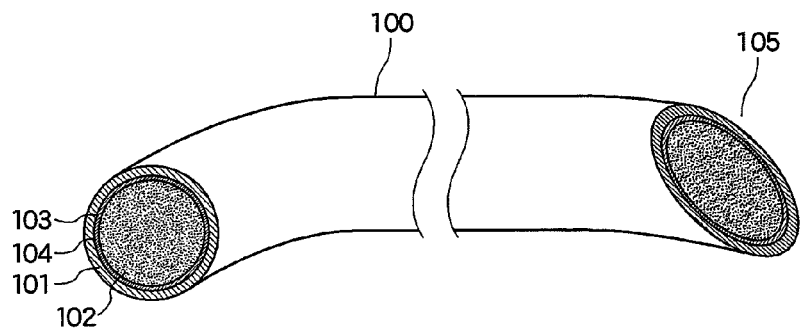
FIG. 5 is a schematic view showing the water introduction tube of the plant automatic water supply apparatus.

The water introduction tube 100 will be explained with FIG. 1, FIG. 2, FIG. 3, FIG. 4 and FIG. 5. The use method and aim are to send to the roots of a foliage plant 121 from the plant automatic water supply apparatus E as shown in FIG. 1. A principle of the water production is a combined technique of the hydrophilic property fibers and a capillary phenomenon. In the constituting content of the water introduction tube 100, an outer covering is, as shown in FIG. 5, a soft resin tube 101 such as silicon. In the inner space of the soft resin tube 100, a water induction outer covering 104 combined a hydrophilic property string 102 bounded in a linear shape such as a hydrophilic property fiber with a water-repellent property outer covering 103 is inserted.

Both ends of the water introduction tube 100 are slant cross-section 105, as shown in a right side of FIG. 5, this cross-section shape is easily the inflow and the discharge of water. An inflow side of the water reservation room 14 dipped in the water 106 and a discharge side is contacted and fixed the slant cross-section 105 toward a down direction against the roots of the foliage plant 121. The inflow water is transmitted forcibly in the water introduction string 104 and reaches to an end of the discharge side and is discharged and dropped to the roots of the foliage plant 121. By the discharge and the drop to the end of the discharge side where the water amount decreases, the water is supplemented and the power supply is repeated. When the water 106 is not contacted to the end of the inflow side, a water sending is stopped.

For convenience sake, the atmosphere conditions are the temperature of 20° C. and the humidity of 60%, hereafter the plant automatic water supply apparatus E will be explained. The beforehand working for the use has explained already, such description is omitted.

The preparation working will be explained. The foliage plant 120 is mounted on the plant automatic water supply apparatus E and the power supply cord 110 is inserted to the plug receptacle 130 and then the preparation is completed. In this embodiment, the commercial AC 1000 volts power supply is used, it adopts the cord having the plug receptacle, however when the sunlight/the wind power generating means and other power supplies are connected, and suited cords will be used.

A driving operation will be explained. When ON/OFF button 78 of the operation panel 72 is pressed, the electrification lamp 82 (red color lamp), the operation light 83 (blue color lamp) are lighted on. These lightings shows that water production drive starts. At the same time, [1000] is displayed on the water supply amount display column 73 the central portion of the liquid crystal screen 73. This [1000] shows that the water of 1,000 cc/day is produced and supplied repeatedly every day.

In the plant planter 121, the necessary water amount differs from the size and the kind of the plant and the season. In this embodiment, the standard water amount is made to have 1,000 cc/day, however it is possible to increase or decrease the water supply amount according to the demands. The adjustment method of the water supply amount will be explained hereinafter.

Figure 6:
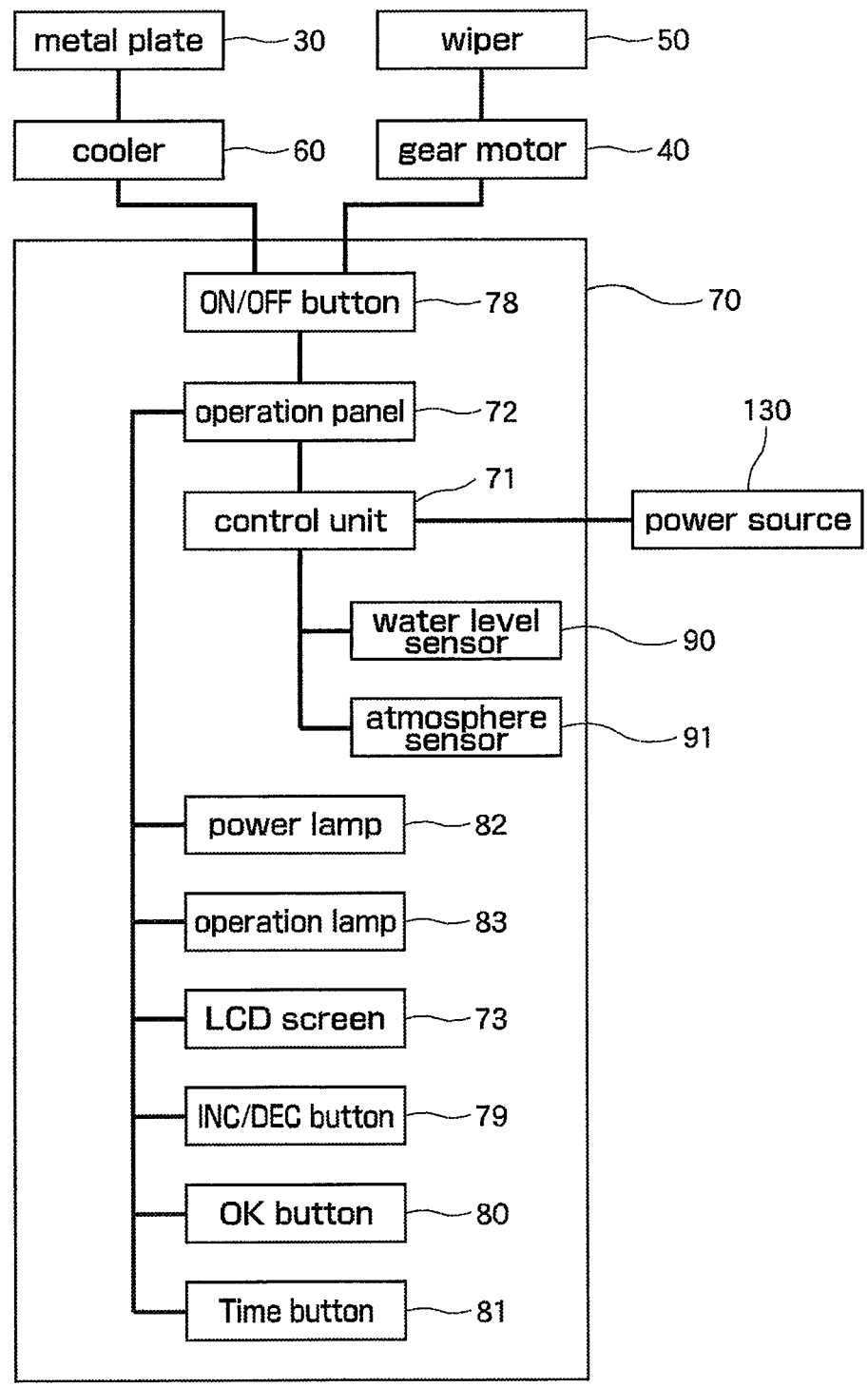
FIG. 6 is a front view showing an operation panel of the water introduction tube of the plant automatic water supply apparatus.
Figure 7:
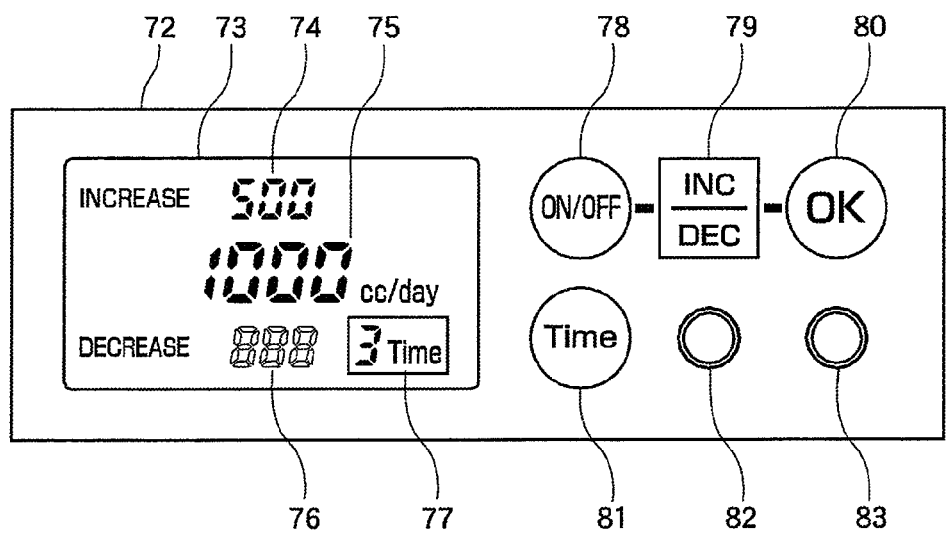
FIG. 7 is a function block-diagram showing the plant automatic water supply apparatus.

The operation method of the increase amount of the water supply amount will be explained with FIG. 6.

When the increase amount side of the increase/decrease button 87 is pressed every one time, a number of the increase amount display column 74 changes 100 cc unit.

(Example: 500 cc increase case) The increase amount side of the increase/decrease button 87 is pressed with five times, it confirms numeral [500] is displayed in the increase amount display column 74 and when the confirmation button 80 is pressed and then the numeral of the water supply amount display column 75 becomes from [1000] to [1500] and the numeral of the increase amount display column 74 is eliminated. Hereinafter, the water supply of 1,500 cc/day continues.

The operation method of the decrease amount of the water supply amount will be explained with FIG. 6.

When the decrease amount side of the increase/decrease button 87 is pressed every one time, a number of the decrease amount display column 79 changes 100 cc unit.

(Example: 400 cc decrease case) The decrease amount side of the increase/decrease button 87 is pressed with four times, it confirms numeral [400] is displayed in the decrease amount display column 76 and when the confirmation button 80 is pressed and then the numeral of the water supply amount display column 75 becomes from [1000] to [600] and the numeral of the decrease amount display column 76 is eliminated. Hereinafter, the water supply of 600 cc/day continues.

When the water production operation is to stop, it makes "OFF" by ON/OFF button 78 of the operation panel 42. In this time, all of the lighting of the electrification light 82, the operation light 83 and the liquid crystal screen 73 are lighted off. Also, it is similar to draw off the power supply cord 110 from the plug receptacle 130. When the working is stopped, all of the contents indicated to the control means 70 to the user become to reset. In the case of the re-operation, it is re-input.

It will be explained the case where the water supply per one day is carried out dividedly. It is possible to carry out the water amount per one day to carry out the water supply by dividing four times from one time. In the case of one time per one day it carries out at the noon, in the case of two times it carries out 9 a.m. and 3 p.m., in the case of three times, it carries out 9 a.m., 1 p.m. and 5 p.m., and the four times, it carries out 7 a.m., 10 a.m., 1 p.m. and 4 p.m.

The indication method of the water supply number will be explained with FIG. 6. It can indicate by pressing the number setting button 81 of the operation panel 72. For example, in the case of the three times supply per day, it displays [3] on the number display column 77 by pressing the number setting button 81 at three times and when the confirmation button 80 is pressed it is the indication completion. In the embodiment, it carries out the number indication until four times. By pressing the number indication button 81, it repeats [1→2→3→4→1]. The division water supply is performed every day to continue as shown in this indication.

The aim for making the water supply number in plural, it is good condition to maintain the healthy condition to the plant, and by obstructing the outflow of the water from the pot 123 it has the effect for preventing the dirt of the installation face.

The contents of the drive operation will be explained. Firstly, the water production ability of the plant automatic water supply apparatus E will be explained. The water production amount is 2,400 cc/day, it 100 cc/hour is 100 cc. When the necessary water amount of the plate to be subjected is 600 cc, the drive time of the plant automatic water supply apparatus E is six hours, during the remaining time of eighteen hours it stops automatically the water production drive. When the division water supply is indicated, it reads out the water supply time and it carries out the water production during the necessary time.

The construction concerning to the water production amount of the plant automatic water supply apparatus E will be explained. The electronic circuit in the control unit 71 of the control means 70 comprises the atmosphere sensor 90 for measuring the atmosphere data such as the humidity and the temperature and the estimation function for theoretically calculating the possible water production amount by the information from the atmosphere sensor 91. On the other hand, there is the information in which the user indicates. The role of the control means 70 is that by arranging this information and it can give the indication for the most suitable drive to the lower rank apparatuses. It continues the drive until to reach to the indicated water amount and it reaches to the predetermined water amount, it becomes the stop waiting condition, and the electrification light 82 lights on and the working light lights off.

The reason why the wiper 50 is necessitated will be explained. The principle of the water production is the natural phenomenon in which since the moisture in atmosphere contacts to the cooled metal plate 30 and it dews on the surface of the metal plate 30. By activating this dew phenomenon and it works to promote the water amount, there is the special covering film ($TiO_2$ and $SiO_2$) etc.) for reforming the surface in the hydrophilicity.

The means for making large the water production amount will be explained. On the surface of the metal plate 30 cooled by the cooler 60, the water film generates immediately after the cooling start. This water film increases linearly with the time (the abrupt increase amount process) and when it reaches to the predetermined time the water film increases gently sloping in parabola shape (the gradually increase amount process) and when the generation water film reaches to the predetermined thickness it becomes to the saturation state. The normal saturation is about one hour. The time lapses more than this time, it does not be seen the increase amount of the water film. The reason of the saturation is that the generation water film itself becomes to the insulating material, since the cooling is obstructed and the temperature difference to the atmosphere runs short, then the dew condensation effect by the cooling vanishes. The re-evaporation water amount is included.

Before the generation water film of the surface of the metal plate 30 saturates, namely at the finish time of the abrupt increase amount process, in the large amount water production, it is important to take out the water. As stated in above, the decency between the lapse time and the generation water amount is that firstly the linear increase amount, next the gradual parabola increase amount, ant the saturated time band is about one hour, the time band to about 30 minutes is the decency of the linear increase amount. The water amount difference of the state leaving 60 minutes on the extension line at 30 minutes is about 1.5 times. By wiping off the water film generated on the metal plate 30, it can extract the large amount water amount, at 30 minutes time about 1.5 times water amount, 72 times (24 hours×2 time×1.5 times=72 times) per day, 2,160 times (72 times×30 days=2,160 times) per month. The wiper burdens the work for wiping off the generation water film.

The operation of the wiper 50 will be explained. On the surface of the metal plate cooled by the cooler 60, the water film is generated during the linear shape increase amount process (the abrupt increase process). After 30 minutes the cooling starts, the wiper 50 operates, the surface adhesion water (the generation water film, the adhesion water film) of the metal plate 30 is wiped off, this water falls down to the bottom face of the water reservation room 14, and it is stored as the water 106. This operation is repeated and the water reservation amount increases.

The operation of the water introduction tube 100 will be explained. In generally, since the height of the plant planter is about 30 cm, it is sufficient by the water supply using the water introduction tube 100. The water sending ability of the water introduction tube 100 attains since it is stronger than the suck force of the plant. It is merely the effect of the natural phenomenon, it has the characteristic in which no electric motive forces requires.

Further, it is desirable to use the small size pump in the case where the height of the plant planter is about 1 m or more than.

It is important to contact the inhale side of the water introduction tube 100 with the water 106. In the floated state, it cannot send water. Accordingly, it is necessity to fix the installation position. As the correspondence idea, it prevents the positional discrepancy by inserting into the grommet 107 to the water introduction tube 100 and by inserting into the throughout hole 108 of the pressing metal fitting 20. It may form the installation position of the water introduction tube 100 at the pressing metal fitting 20. By aligning the installation position of the water introduction tube 100, it can provide the through-out hole 109 on the upper cover 22 according to demands.

A modified example of the metal plate type water production apparatus of the present invention will be explained. The plant automatic water supply apparatus E is stated as the planter plant use small size water production apparatus, however it is possible to apply to the greening use large size water production apparatus for the desert, and the accident•emergency use home water production apparatus and so on. Further, it is possible to apply the humidifying and dehumidifying apparatus of the ground room etc.

A modified example of the metal plate 30 will be explained. The metal plate 30 can be selected as the most suitable one according to the size and the use of the product to be subjected. It can lineup the product main body for forming small, the super hydrophilic property heat plate<hydrophilic property heat plate<heat plate<aluminum (Al) plate. In this embodiment, it adopts the hydrophilic property heat plate. The size of the hydrophilic property heat plate is the outer size of 150 mm, the height of 33 mm and the area of the hydrophilicity face is about 150 cm$^2$.

Next, the water collection metal plate and the water collection metal element will be explained.

Concerning to the water collection metal plate and the water collection metal element of the present invention, it will be explained the water collection metal plate (hereinafter it is called as "water collection metal plate A") having the easy wet ability and water collection performance, the water collection metal element (hereinafter it is called as "water collection metal plate B") which is formed as the element used for the various environment means using the heat plate having the superior cool air transportation performance and the water collection device (hereinafter it is called as "water collection metal device C") constituted by arranging and piling the plural water collection metal plates B to collect the large amount water from the moisture in atmosphere with the low price.

Figure 8:
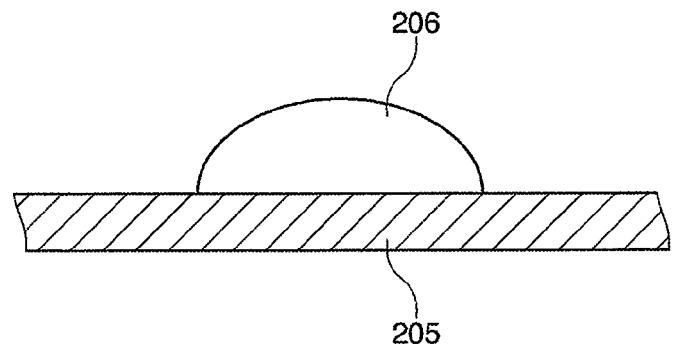
FIG. 8 is a view showing a non-hydrophilic property water droplet.
Figure 9:
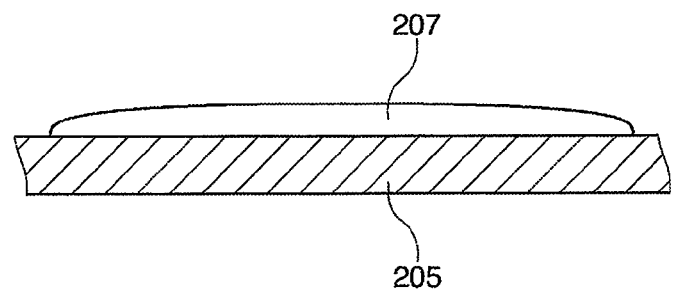
FIG. 9 is a view of a hydrophilic property water droplet.
Figure 10:
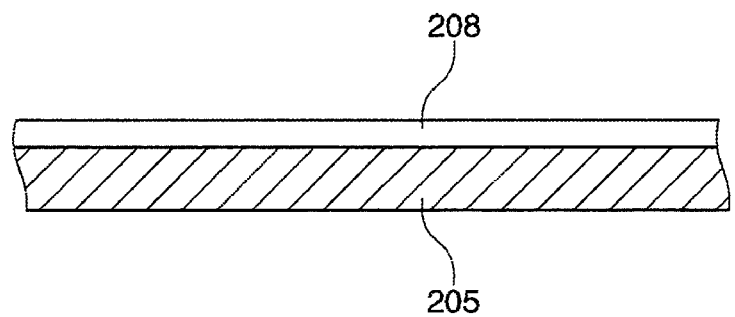
FIG. 10 is a view showing a super hydrophilic property water film.

The water collection performance is the hydrophilic property from the aspect of the material phenomenon. As to the hydrophilic property, the states of the adhesion water on the metal plate will be explained with from FIG. 8 to FIG. 10. FIG. 8 shows the water droplet at the non-hydrophilicity time, FIG. 9 shows the water block in the hydrophilicity time, and FIG. 10 shows the water film state at the super hydrophilicity time. When the hydrophilic property progresses, it becomes the water film state and the water collection performance improves.

The basic element in the present invention is the water collection metal plate A having the easy wet ability performance and the high water collection performance and for collecting water from the moisture in atmosphere. The water collection metal plate B is constituted to have the easy use embodiment using the water collection metal plate A as for the various uses and is added the heat plate function having the superior heat transportation performance. The water collection metal device C is constituted by arranging and piling the plural water collection metal plates B and collects the large amount water from the atmosphere. By the water collection metal plate A, the water collection metal plate B and the water collection metal device C, it can apply as the main element used in the various environment apparatuses. Hereinafter, the application examples will be explained.

The material of the water collection metal plate A is stainless (SUS304) and the size is 1,000 mm×1,000 (1,500) mm×0.3 mm. The size of the water collection device C is the outer shape size of 1 mm×1 (1.5) mm×1.8 (2.7) m$^3$ in the case where twenty-four sheet water collection metal plates B are arranged by the space 75 mm with the interval. Hereinafter, the application examples will be explained.

About the water production apparatus: Since the greater part of the need is required the large water amount, it uses the water collection metal device C. The target water amount at the humidity of 60% 130% is 2/1 tons per day in the case of the capacity volume of 1.8 m$^3$. The water unit price per one little is about 0.5 Yen. The equipment articles of the water production apparatus are the water collection device C in mainly, the cooling means, the ultra sonic oscillating means, the control means, the water reservoir tank, the stand etc. and then it can realize the water production function.

About the building cooling means: The water collection metal plate A attached to the outer wall of the building is used. The equipment articles, except for the water collection metal plate A, are merely the water pouring use related means for pouring the water to the water collection metal plate A and the water source. The water source is the water production apparatus stated in above, the power source uses the generation means of the sunlight power and the wind power and the electric power rates and the water rates becomes zero. There is no standard size to perform by aligning with the building to be subjected.

About the room humidifying apparatus: The water collection metal plate A is used by leaning it against the outer wall of the building. The equipment articles, except for the water collection metal plate A, are merely the water pouring use related means for pouring the water to the water collection metal plate A and the water pipe. Further, it is sufficient to have the water production apparatus stated in above installed to the outer portion. There is no standard size to perform by aligning with the wall.

About the room dehumidifying apparatus: The water collection metal plate A is used by leaning it against the surrounding portion of the wall in the room. The equipment articles, except for the water collection metal plate A, are the cooling means, the ultra sonic oscillating means, the control means, the water discharge system components. There is no standard size to perform by aligning with the wall.

About the room humidifying and dehumidifying apparatus: The humidifying and dehumidifying apparatus uses together the humidifying apparatus with the dehumidifying apparatus as stated in above and it uses the water collection metal plate B. It can supply the both functions by using all of the both apparatuses. The size is the same to the dehumidifying and humidifying apparatus stated in above.

About the roof removal apparatus: The water collection metal element B is used by mounting it on the roof. The equipment articles are merely the heat collection bodies for collecting heat from the free heat source such as the underground heat and the water collection metal element B and the heat introduction wire for connecting thermally between the above stated bodies and the installation use attachment articles. There is no standard size to perform by aligning with the size of the roof.

The water collection metal plate having the easy wet ability performance and the water collection performance will be explained in hereinafter.

Figure 11:
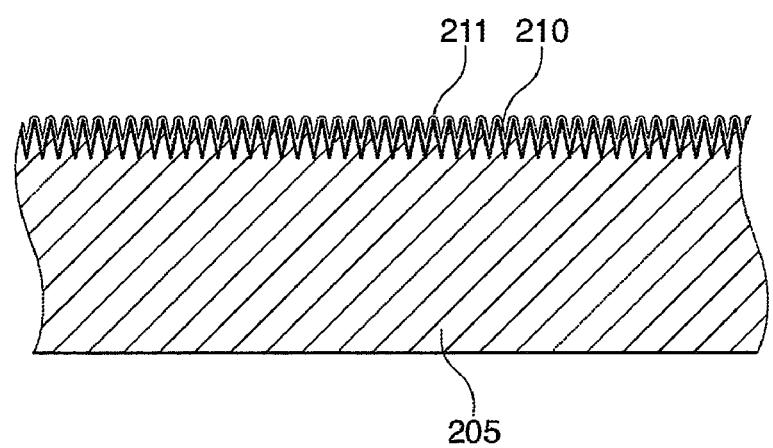
FIG. 11 is a cross-sectional outline view showing a high water collection performance metal plate.
Figure 12:
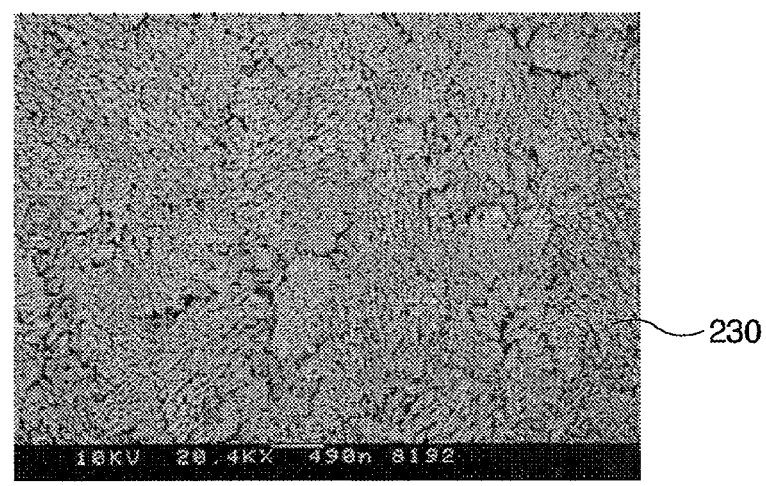
FIG. 12 is a twenty thousands times plane photography showing a $TiO_2$ crystal (anatase structure).

FIG. 8 is the cross-sectional view showing the water droplet on the surface of the non-hydrophilic property metal plate, FIG. 9 is the cross-sectional view showing the water block on the surface of the high hydrophilic property metal plate, and FIG. 10 is the cross-sectional view showing the water film on the surface of the super high hydrophilic property metal plate, it shows that it proceeds the hydrophilicity, the water droplet becomes to the water film state. FIG. 11 is the cross-sectional concept view of the metal plate in which the surface is reformed to high water collection performance, FIG. 12 is a photography by the electron microscope having twenty hundreds times in the state in which $TiO_2$ crystal structure reveals the super hydrophilic property, FIG. 13 is the slant state photography, and FIG. 14 is the production process flowchart (the automatic production equipment and the processing summary) of the water collection metal plate A.

The use method of the water collection metal plate A in this embodiment will be explained with figures.

Figure 15:
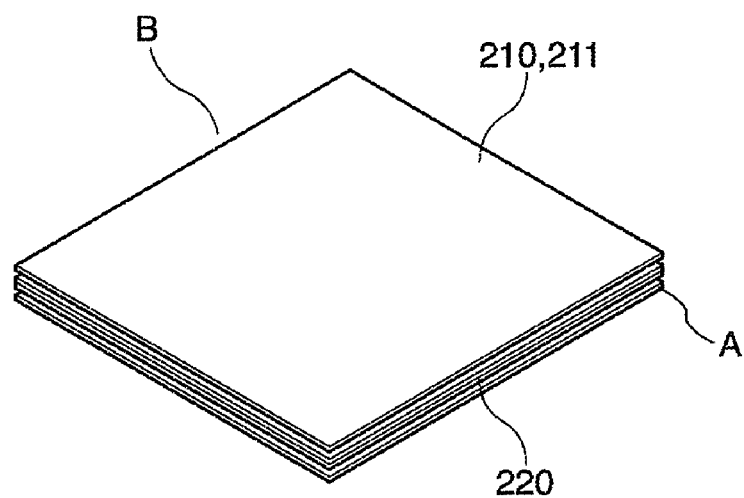
FIG. 15 is an outline view of a water metal plate element B.
Figure 16:
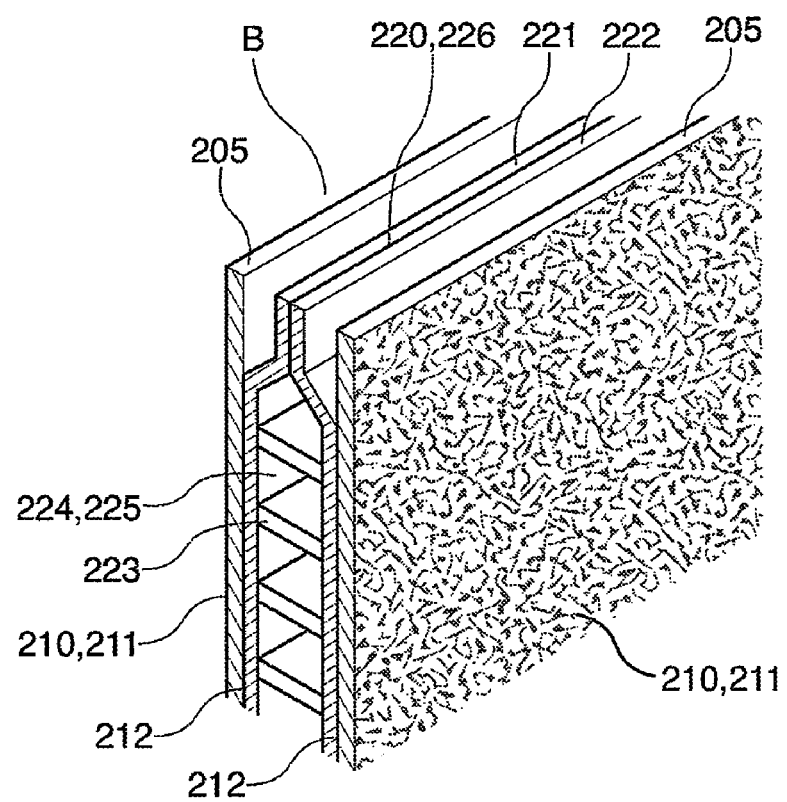
FIG. 16 is a cross-sectional view of the water metal plate element B.
Figure 17:
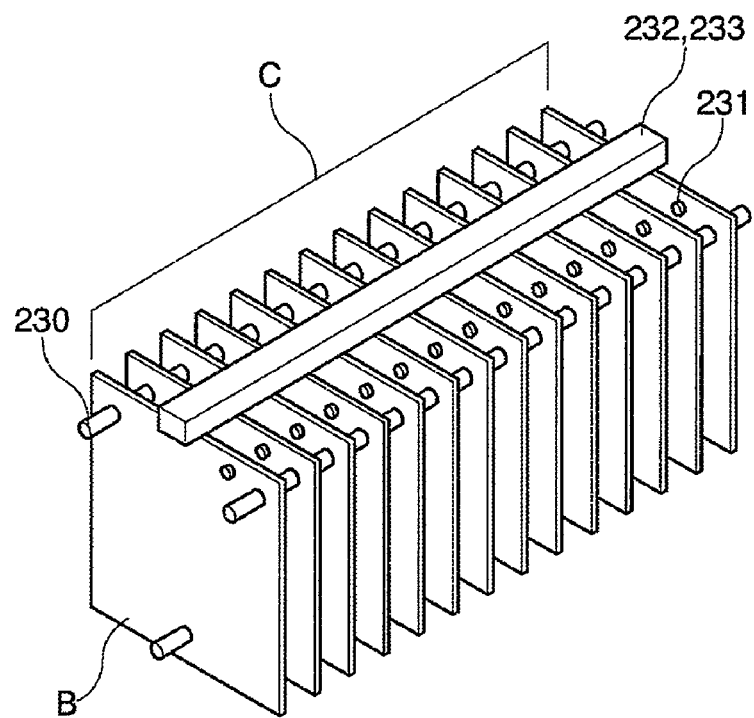
FIG. 17 is an outline view of a water metal plate device C.
Figure 18:
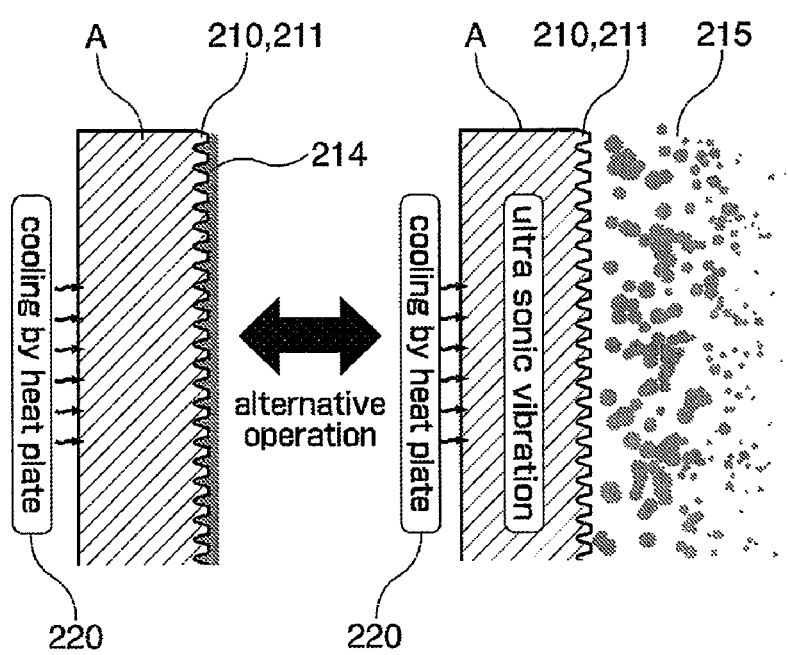
FIG. 18 is an explanation view of a water collection and a water film removal.
Figure 19:
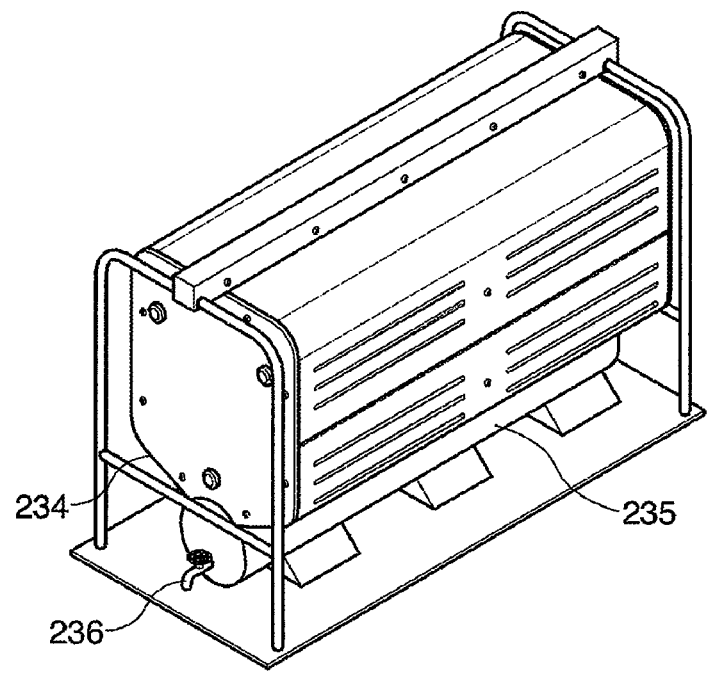
FIG. 19 is an outer appearance view showing another embodiment of a metal plate type water production apparatus.
Figure 20:
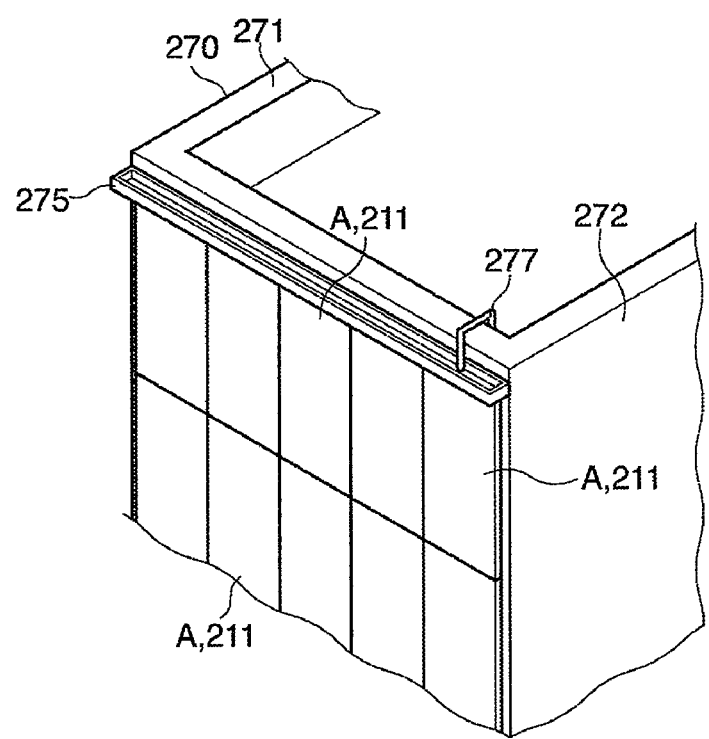
FIG. 20 is an installation view showing a building cooling apparatus.
Figure 21:
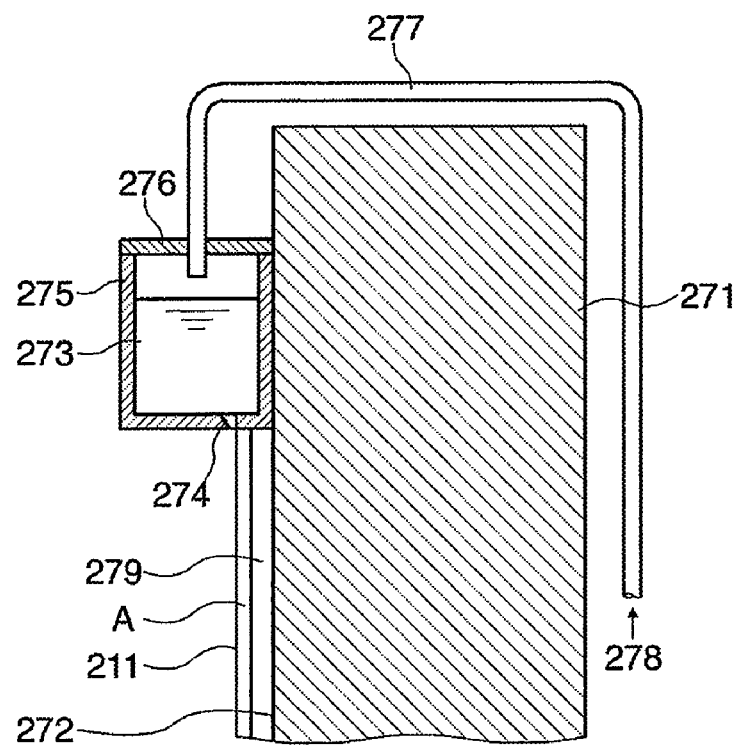
FIG. 21 is a cross-sectional detailed view showing the building cooling apparatus.
Figure 22:
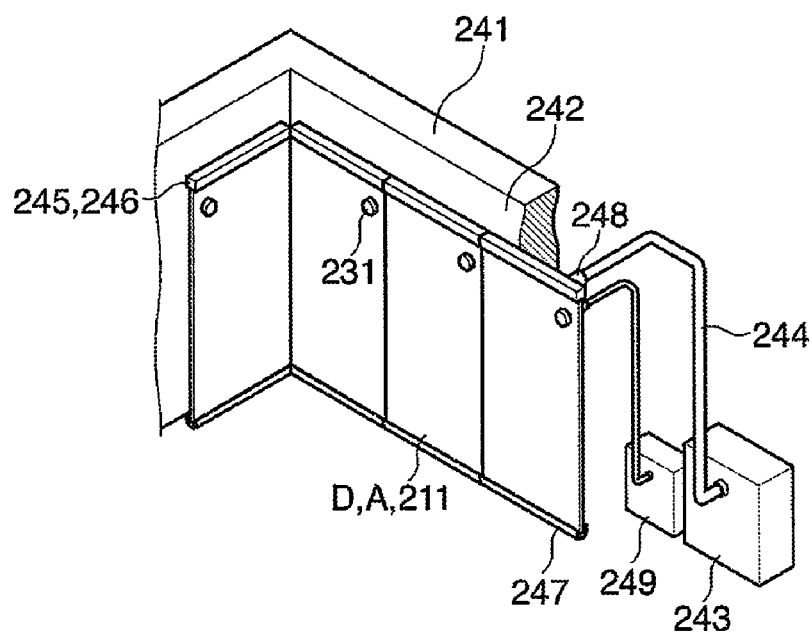
FIG. 22 is an installation view showing a room dehumidifying apparatus.
Figure 23:
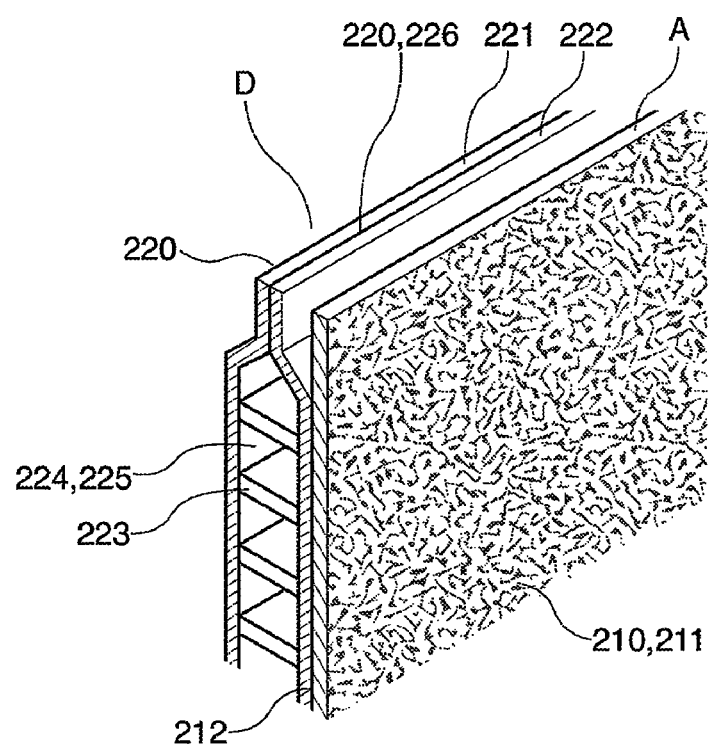
FIG. 23 is a cross-sectional view showing a water collection metal element D.
Figure 24:
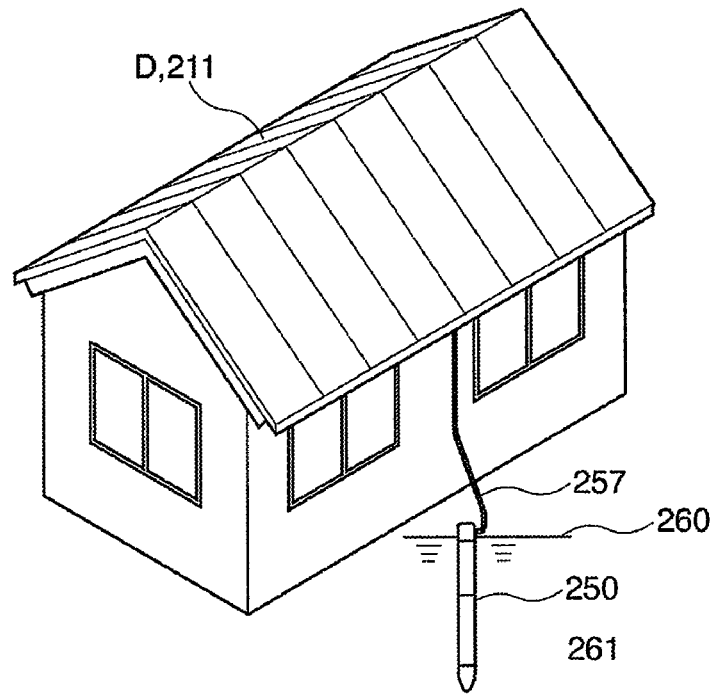
FIG. 24 is an installation view showing a roof snow removal apparatus.
Figure 25:
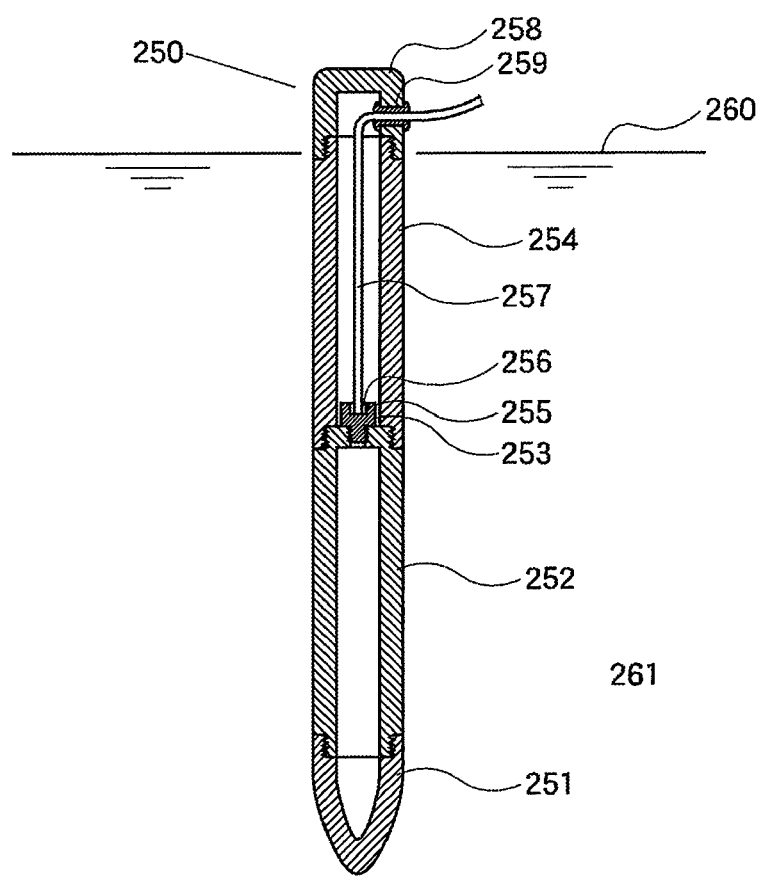
FIG. 25 is a cross-sectional view showing a heat collection body.
Figure 26:
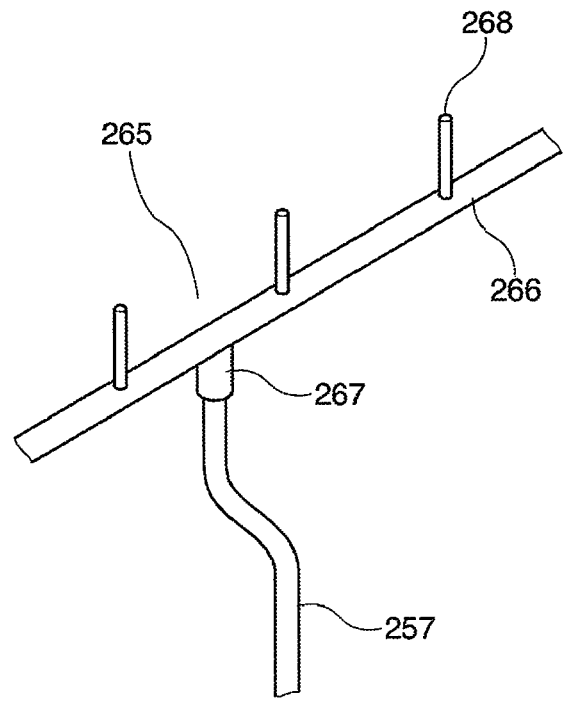
FIG. 26 is an enforcement attachment article showing the roof snow removal apparatus.

FIG. 15 is an outer appearance view of the water collection metal plate B, FIG. 16 is a cross-sectional view of the both sides type water collection metal element B, FIG. 17 is a concept view of the water collection metal device C, FIG. 18 is an explanatory view of the water collection state and the water film removal state, FIG. 19 is an outer appearance view of the metal plate type water production apparatus, FIG. 20 is an installation state view of the building cooling apparatus, FIG. 21 is a cross-sectional view of the installation state of the building cooling apparatus, FIG. 22 is an installation state view of the room dehumidifying apparatus, FIG. 23 is a cross-sectional view of the one side type water collection metal element D, FIG. 24 is an installation state view of the roof snow removal apparatus, FIG. 25 is a cross-sectional view of the heat collection body of the roof snow removal apparatus, and FIG. 26 is an enforcement attachment articles of the roof snow removal apparatus.

In from FIG. 8 to FIG. 11, a numeral 205 is the metal plate, a numeral 206 is the water droplet at the non-hydrophilicity time, a numeral 207 is the water block at the high hydrophilicity time, and a numeral 208 is the water film at the super hydrophilicity time. A numeral 210 in FIG. 11 is a schematic view of the state showing an even and uneven state after the roughness performance of the surface of the metal plate 205, a numeral 211 in FIG. 11 shown the hydrophilicity surface of the thin film to which $TiO_2$ being the hydrophilic property material is attached. Actually, as seen the hydrophilicity surface 211 shown in FIG. 16, it is the complicate pattern even and uneven surface. The material of the metal plate 205 to be used is stainless (SUS304) or the aluminum (Al).

The roughness performance processing method: The sand blast processing in which the parcels having the various different hardness is pressure injected, it makes to have the roughness surface having the many size even and uneven surfaces to form the effective surface area more than about three times with the surface area of the before processing. It is possible to attain this roughness performance processing in plural times using the particle bodies having the different particle grades.

The crystal face processing method: Since in the water collection metal device C used for the water production apparatus the ultra sonic oscillating means is operated to remove the generation water film (the adhesion water film), it is fallen down easily the crystal attached in the after process. Accordingly, it is necessary to carry out the preliminary processing for improving the combination strength to crystallize the material having the different material with the metal on the surface. In this preliminary processing, the even and uneven shape roughness performance is performed to the crystal face of the metal plate using the plasma etc.

The high water collection performance surface reformation: To attain the high water collection performance and to reveal the super hydrophilic property, it is necessary to fix the hydrophilic property material (TiO2) with the thin film state against the roughness surface 210 of the metal plate 205. In this working method, after the sol liquid containing the minute powders has brown out against and coated to the subjective surface, under the enforcement conditions for revealing the hydrophilicity degree at the maximum it carries out the glazing processing. The temperature/time for carrying out the heating and glazing are about 40° C./about 30 minutes. The photography shown in FIG. 12 and FIG. 13 show the crystal state of the anatase structure in which $TiO_2$ reveals the super hydrophilic property.

The hydrophilic property fixing method: When immediately after the crystal 230 is generated by the heating, it cools from the high temperature to the normal temperature at a stretch, since it has the decency in which the degree of the hydrophilic property attenuates, it is necessary to cool gradually by controlling the time for lowing from the heating time to the normal time. The time from 400° C. to the normal temperature requires about more than thirty minutes.

The water collection type metal plate A manufacturing method: The production process of the water collection metal plate A will be explained with FIG. 14. This carrying-out embodiment is a free-flow line system automatic production equipment. An effective width of this line is about 1,000 mm and is constituted by nine processes.

Process 1: This process is one to automatically supply the metal plate 205 having the size of 1,000 mm×1,000 (15,000) mm×0.3 mm from the stacked place to the line using a robot.

Process 2: This process is before roughness processing in which a sand blast processing of the pressure injected particle size has about 0.1-1.0 mm, and this process carries out the rough roughness performance against the metal surface.

Process 3: This process is after roughness processing in which a sand blast processing of the pressure injected particle size has about less than 0.1 mm, and this process carries out the minute roughness performance against the metal surface. By the roughness performance with the process 1 and the process 2, the roughness surface 210 reveals and thereby the effective surface area is formed more than three times in comparison with the before processing.

Process 4: This process is one in which the damage is added to the crystal of the metal plate surface by irradiating the plasma or the laser. However, it may be unnecessary to carry out this process, according to the use of the production article.

Process 5: This process is one against the roughness surface 210 the sol liquid including $TiO_2$ minute powders is blown out against and coated. The film thickness of $TiO_2$ is a super thin film of 1-0.01 micron and this is an important blowing-out processing condition. $TiO_2$ concentration of sol, the injection amount and the injection time etc, are important, the production management is carries out both the control means and the worker.

Process 6: This process is one the super hydrophilic property crystal of TiO2 is generated to the anatase structure using a heating use electric furnace. To obtain the anatase structure crystal, the heating temperature and the time management are important and it carries out by an automatic control means. The temperature/the time are about 400° C./thirty minutes.

Process 7: This process is a gradual cooling process for fixing the characteristics of the hydrophilic property. Until the surface temperature of the product article presents about 40-150° C. the gradual cooling carries out about twenty-five minutes and until about 150-50° C. the abrupt cooling carries out about five minutes. The finish temperature is 50° C. and this aim is the safety insurance of the worker.

Process 8: This process is a quality control. The roughness degree estimation for judging the quality of the roughness is comprised by comparing the reflection light amount according to the light irradiation and a hydrophilic performance estimation means for judging the quality the adhesion state of the water film using a camera image. Further, a good article goes to a next process and a bad article is taken out from the line.

Process 9: A completed product article is discharged from the line using the robot, and is stacked automatically at the indication position. At the same time, the stamp of the quality sheet is carried out automatically. To the quality sheet, the production date, the inspector No., the serial number etc, are printed. With the above, the production process of the water collection metal plate A finishes.

The embodiment in which the water collection metal plate A is used as a main element will be explained with following (1)-(6).

(1) The metal plate type water production apparatus: The principle and the attaining means of the metal plate type water production apparatus will be explained. The principle of the water production is the natural phenomenon in which the metal is cooled and the dew water is generated on the surface. Utilizing this phenomenon at the maximum, the means for collecting the large amount water is one of the essential points of the present invention. The attaining means for the large amount collection water are following five points.

A first point is "the water collection metal plate A" of the water collection metal plate having the easily wet ability performance and the superior water collection performance.

A second point is "the both sides type water collection metal element B" in which the water collection metal plate A has the cooling performance and the treatment performance.

A third point is "the water collection metal device C" in which the large amount collection water is aimed by multi-making the water collection metal element B.

A fourth point is a whole is cooled by the part of the cooling of both sides type water collection metal device B using the cooling means.

A fifth point is that in time band (until the linear increase amount finish time) of the abrupt increase amount process (within the linear increase amount process) it removes the generation water film (the adhesion water film) and then the collection water amount becomes more than 1,000 times. This is the device for the water production having the most effect. As the generation water film removal means, the ultra sonic oscillating mechanism is used. The five points stated in above are the devices for obtaining the desirable water amount. The water amount in this embodiment is stated in above, and the embodiments are shown in FIG. 17 and FIG. 19.

Figure 2:
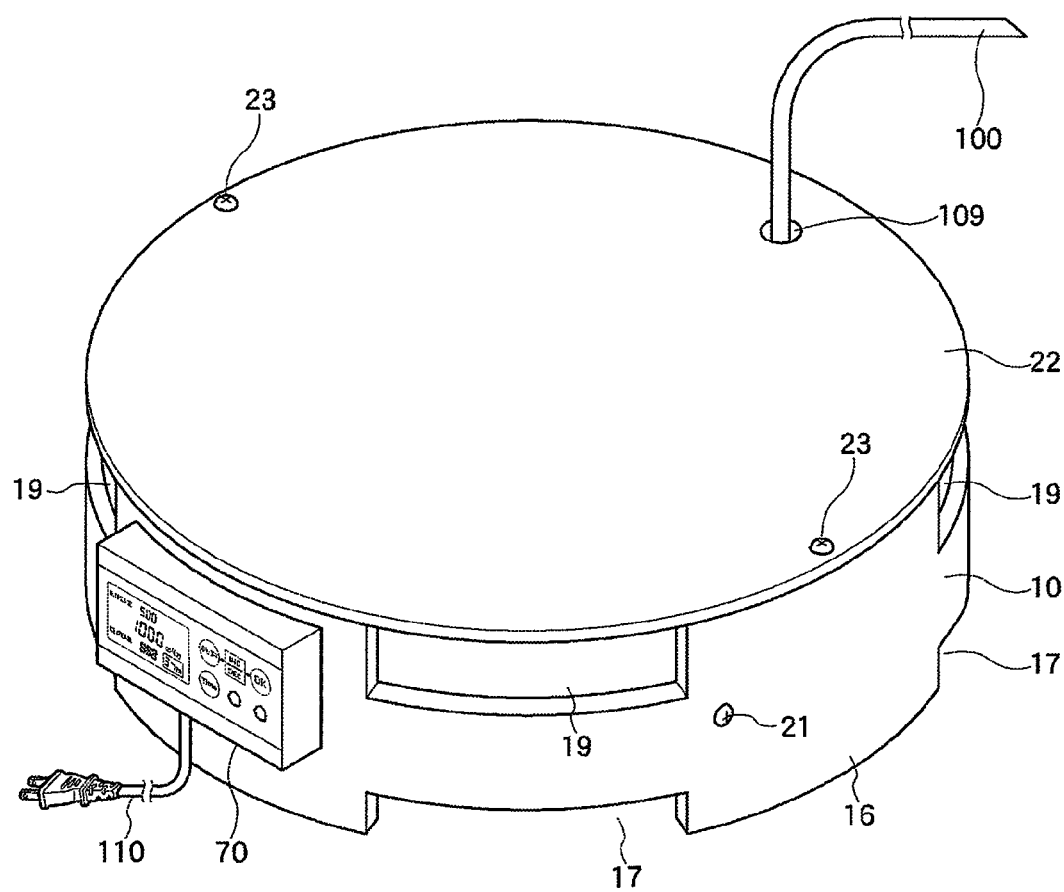
FIG. 2 is a schematic view showing the plant automatic water supply apparatus.

The outer appearance of the water collection metal element B is shown in FIG. 15 and the cross-section is shown in FIG. 16. The both sides face type water collection B comprises one body with the heat plate 220 having the superior heat transportation performance, which is sandwiched between two sheet water collection metal plates A in which the hydrophilicity surface 211 being reformed to the water collection performance is directed toward the outer side and the joining surface 212 being performed by the heat joining. Further, a case where a clearance (a space) is formed between the water collection metal plate A and the heat plate 220, in other words the water collection metal plate A and the heat plate 220 is not joined, the propagation of the ultra sonic becomes good. When it uses for the room dehumidifying apparatus and the roof snow removal apparatus, the water collection metal plate A shown in FIG. 2 and FIG. 3 is adopted only to the one side and uses the one side type water collection metal element D in which the cost price is lowered.

The heat plate 220 will be explained. The heat plate 220 is formed with two sheet thin aluminum (Al) plates 221, 222 as shown in FIG. 12. In an inner space 224 between the aluminum plate 221 and the aluminum plate 222, plural partition walls 223 is provided, in the inner space 224 a heat transportation performance medium 225 having the superior heat transportation performance is sealed in. A cool end face of the heat plate 220 is cooled, according to the work of the heat transportation performance medium 225 the aluminum plate 221, 222 are cooled rapidly, then the metal plate 205 is cooled, as a result a whole both sides type water collection metal element B is cooled. Due to this cooling, the moisture in atmosphere dew condensation to the hydrophilicity face 211 and it can collect effectively the water.

The water collection metal device C for collecting the large amount water from the atmosphere will be explained with FIG. 17. The water collection metal device C is formed by piling and by overlapping plural (fourteen sheet in FIG. 17) both side type water collection metal plates B with the intervals. In FIG. 17, the use number of the metal plates 205 is twenty-eight sheet and it is constituted to have twenty-eight times against the water collection ability per one sheet in the metal plate 205.

The water collection metal device C is constitute by plural fixing rods 230 for fixing and spiting the plural water collection metal elements B, a cool air pipe 232 for transporting and distributing the cool air against each cool end face 226 of the heat plate 220, and a cover 233 for storing the cool air pipe 232 and the water film 214 (shown in FIG. 18) generated on the hydrophilicity face 211 is removed by the operation of the ultra sonic vibrator 231. By increasing the installation number of the water collection metal element B, it can set a desirable water collection amount, this is the effective characteristic of the present invention.

The water collection operation of the water collection metal device C will be explained with FIG. 18 expressed by simplifying FIG. 16. The left side of FIG. 18 shows the case in which the metal plate 203 is cooled by the cooling of the heat plate 220 and the water film 214 is generated on the surface of the hydrophilicity face which is reformed to the roughness performance and the water collection performance. The right side of FIG. 18 shows the case the ultra sonic vibration is given according to the operation of the ultra sonic vibrator 231 to remove the generation water film 214 and the generation water film 214 is flipped off (is wiped) from the hydrophilicity face 211 and the state to be became the water 215 is shown simply. Further, since the hydrophilicity face 211 has the complicated even and uneven face it expresses hardly with the figure, it expresses the rough sketch with the saw state. Further, the water 215 is flipped off but actually the water runs. It is possible to adjust the flip-off/run condition by the largeness of the oscillating frequency of the ultra sonic vibrator and the oscillating power. The "run" condition is 500 W, about 30 KHz and the vibration time is about five seconds×sheet number.

The outer appearance being the embodiment of the metal plate type water production apparatus main body is shown in FIG. 19 for reference. Since in the present invention the water collection metal device C shown in FIG. 17 is a main body, the detailed explanation of FIG. 19 is omitted. The equipment articles shown in FIG. 19, omitted in FIG. 17, are a funnel plate 234 for collecting the water in a center, a water reservoir tank 235 and a tap 236. Further, it is dispensable to the water production apparatus, however the equipment articles such as a cooling means main body, a ultra sonic oscillating means main body, a control means, and a power source are omitted from the figure.

(2) Building cooling apparatus: The building cooling apparatus will be explained with FIG. 20 and FIG. 21. To a whole face of a building 270, except for a window of an outer wall 272, the water collection metal plate A is installed. A conduit body 275, which supplies water to an upper end of the hydrophilicity face 211 of the water collection metal plate A, is provided at a vicinity of a handrail wall 271. The water supply and the water discharge of the conduit body 275 is that the water sent from a water sending pump 278 (not shown in drawing) through a water sending pipe 277 reaches to a water tub 273 in the conduit body 275 and a necessary water amount is discharged from a water discharge slit 274 little by little. To prevent the foreign matter mixture such as fallen leaves into the water tub 273, a cover 276 is provided on an upper portion of the conduit body 276. In the conduit body 275 in FIG. 20, the cover 276 is omitted so as to be seen easily.

The principle and the operation of this building cooling apparatus will be explained. The principle is the application of the evaporation heat phenomenon in which the large amount heat is taken from the surrounding portion during the water evaporation. In generally, it is called as "water the garden effect". Concerning to the operation, the water on the hydrophilicity face having super hydrophilic property does not fall down as the water droplet but it appears the state to which the water film adhered and it reveals the phenomenon in which the adhered water falls down little by little. This adhered water evaporates and decreases the amount, the water enters to fill up it. The repetition of this water pouring and the evaporation is the principle and the operation to cool a whole building according to the evaporation heat.

It has an enforcement condition, since a space 279 is provided between the outer wall 272 and the water collection metal plate A and there has an effect of a rear face. The water the garden effect of the building cooling apparatus is to said building but also to the surrounding portion of the building and a whole town, it is suitable to make the town making such as the shopping district.

The water for the building cooling apparatus may adopt the city water but since the chlorine compound and the minerals are contained, the water discharge slit 274 plugs, it is necessary to carry out periodically the cleaning. To avoid this maintenance, it can use the clean water according to the above stated metal plate type water production apparatus. The reason is that since the water steam is the purity water system true water which becomes the water in one breath, the impurities mix hardly. As the provision of this metal plate type water production, it has the heal space formation according to the roof greening and the securing of the water source at the emergency time, it is suitable as a whole.

(3) The room humidifying apparatus: The aim of the room humidifying apparatus is that to the dry room air it is to contain the water component and to humidify. The humidifying method is the same method with the above stated building cooling apparatus. The water collection metal plate A in the building cooling apparatus is installed to the outer wall but in the room humidifying apparatus the water collection metal plate A is used by leaning up to the wall vicinity in the room. As an embodiment, since it will be explained in a latter (5) the humidifying and dehumidifying apparatus it will be omitted.

(4) The room humidifying and dehumidifying apparatus: The room humidifying and dehumidifying apparatus will be explained with an installation state view of the room humidifying and dehumidifying apparatus shown in FIG. 22. A numeral 241 is a room wall, 242 is an installation wall face, 243 is an outside installation cooling means, 244 is a cool air transportation pipe, 245 is a cooling end, 246 is an accessory cover of the cooling end 245, 247 is a water discharge use accessory conduit, 248 is a connection port of the cool air transportation pipe 244 and the cooling end 245, 249 is a ultra sonic oscillating means main body and a vibration transmission wire, 231 is a ultra sonic vibrator, D is the one side type water collection metal plate D (it may adopt the both sides type water collection metal element B shown in FIG. 16), and 211 is the hydrophilicity face of the one side type water collection metal plate D or the both sides type water collection metal element B.

In the installation of this room humidifying and dehumidifying apparatus, the use number of the ultra sonic vibrator 231 is the same in the one side type water collection metal plate D/the both sides type water collection metal element B. Further, during the enforcement time, it can provide a space having about 10 cm between the one side type water collection metal plate D/the both sides type water collection metal element B and the wall face 242. A discharge pipe for discharging the water is omitted from the figure.

The operation procedure of this room humidifying and dehumidifying apparatus will be explained. The cool air from the cooling means 243 passes through the cool air transportation pipe 244, the connection port 248, the cooling end 245 and the one side type water collection metal plate D/the both sides type water collection metal element B is cooled, the moisture component in the room air extracts as the dew commendation water to the hydrophilicity face 211. The water on the hydrophilicity face 211 does not fall down as the water droplet but adheres with the water film state. To remove this water film, by the timer operation of the ultra sonic oscillating means main body 249 the ultra sonic oscillator 231 operates, the water film makes the water block and is fallen down, then extraction water is discharged from the accessory conduit 247 to the building outside. The operation time of the ultra sonic oscillator 231 is about 5 seconds on the one side type water collection metal plate D/the both sides type water collection metal element B per one sheet and the operation sound is no sound since because of the ultra sonic wave.

(5) The humidifying and dehumidifying apparatus: The air humidity in the room changes in spring, summer, autumn, and winter. The comfortable humidity differs from the persons and is about 50%. Accordingly, it carries out the humidification and the dehumidification. As a result, it requires the apparatus having the both functions of the humidifying apparatus (3) and the dehumidifying apparatus (4). It is possible to use the one side type water collection metal element D/the both side type water collection type water metal plate B and the equipment articles required by the both apparatuses. Hereinafter, the dehumidifying and humidifying apparatus will be explained with FIG. 22.

When it operates as the humidifying and dehumidifying apparatus, it will be the same to the humidifying and dehumidifying apparatus (4). When it operates as the humidifying apparatus, it will be the same to the building cooling apparatus (2), it soupy the water from the upper end of the hydrophilicity face 211 of the one side type water collection metal element D/the both side type water collection type water metal plate B. Accordingly, as the equipment articles to be added to the state of FIG. 2, a water sending pump 278 is added at the vicinity of the cooling means 234 and the conduit body 275 is stored in the inner side of the accessory cover 246, and the respective additional equipments are carried out, from the slit 274 of the conduct body 275, the water is fallen down little by little to the upper end of the one side type water collection metal element D/the both side type water collection type water metal plate B. With above, it can function as the humidifying and dehumidifying apparatus. Further, to maintain the comfortable humidity it necessities an automatic control means. So as to this, the control circuit is made to install in the interior portion a detection sensor for the humidity and the temperature, and it can carry out the control operation for the cooling means being the accessory article, the ultra sonic oscillating means main body, and the water sending pump.

(6) The roof snow removal apparatus: The roof snow removal apparatus will be explained with from FIG. 24 to FIG. 26. FIG. 24 is an installation state view of the apparatus, FIG. 25 is a heat collection body of the roof snow removal apparatus, and FIG. 26 is an enforcement attachment article of the roof snow removal apparatus. The components enable to be seen from an outside of the roof snow removal apparatus are the one side type water collection metal element D, a heat introduction wire 257 and a main body portion of a heat collection body 250. The enforcement is easy and is performed with a low cost. The use electric power is zero.

A structure of the heat collection body 250 shown in FIG. 25 will be explained. A numeral number 250 is a ground face, 261 is a underground, 251 is a underground burying body, 252 is a heat receiving pipe of the underground heat, 253 is a heat reserving body, 254 is a heat insulating body, 258 is a cap, 251 and 252, 252 and 253, 252 and 254 and 254 and 258 are respectively screw fittings, 255 is a wire hole provided on the heat reserving body, 266 is a soldering for thermally jointing a heat introduction body 257 and the heat reserving body 253, and 259 is a rubber ring fitted to a lateral hole of the cap 258. A size of the heat collection body 250 is an outer diameter of 90 mm×1,000 mm.

The use method of the heat collection body 250 is that as shown in FIG. 25 after the heat collection body 250 has buried in the underground, the heat introduction wire 256 is extended, the underground heat (about 15° C.) is transmitted to the one side type eater collection metal element D. In a midway of this transmission, an enforcement use attachment article 256 shown in FIG. 26 is used. With the heat introduction body 257 extended from the inner portion of the heat collection body 250, the underground heat is heat transported to a heat distribution terminal 268 by passing through a connection port 267 and a heat transfer pipe 266. A heat reception from the terminal 268 to the one side type eater collection metal element D is carried out using a thin heat introduction wire (not shown in drawing). Further, a number the one side type eater collection metal element D is the same to a number of the terminal 268. A fixing use metal fitting between the roof and the one side type eater collection metal element D are not omitted from the drawing.

The operation contents to reach the roof snow removal will be explained. As the underground heat, the temperature of the underground in about 1 m from the ground face is about 15° C., it is a limitless heat source in which the change does not generate for year. By applying this heat source, the snow removal apparatus operated, the consumption electric power does not require entirely. The one side type eater collection metal element D is heated by the underground heat, it does not freeze during the severe cool time. The water film is formed at always on the surface of the hydrophilicity face 211, it presents the wet state, snow drops by the snowslide phenomenon. This operation is repeated and the carrying out of the snow fall-downing working becomes unnecessary.

Concerning to the materials of the equipment articles used for the roof snow removal apparatus, the heat conduction system burying body 251, the heat receiving pipe 252, the heat reserving pipe 253, and the heat introduction wire 257 employ the high heat conduction performance copper system alloy. Further, the heat introduction wire 257 is composed of the bundled twist wire of the copper system alloy thin wires, and at an outer periphery a wire performed by the heat insulating performance covering. The heat insulating pipe 254 and the cap 258 are used the complex resin material.

The heat collection body 250 is a underground burying monopoly one, when the heat source having 10° C. exists during the winter time in the vicinity of the building to be subjected to the installation, without this heat connection body 250, only the heat introduction wire 257 will be dispensed. In this case, by removing the covering of the heat introduction wire 257 and a bare body is formed and this part can be thrown into the heat source.

A modified embodiment of the water collection metal plate A of the present invention will be explained. In the production of water collection metal plate A shown in FIG. 14, it is unnecessary to operate all of the nine processes. It can select the operation/non-operation of the respective processes according to the use or the customer request. For example, when the goods ordered may be until the process 3, it can product by the automatic production line having the control means in which it can passes through after the process 4.

A modified embodiment of the metal plate type water production apparatus shown in FIG. 17 and FIG. 19 will be explained. As stated already, the water generated by this metal plate type water production apparatus is the purity water system true water. In the dyeing works, since the metal ion (Ca, Mg, Fe, Mn etc.) contained in the service water becomes the primary factor of the slightly burred color and is the obstruction in the process, normally it uses the metal ion blockade agent. To exclude the wastefulness, it is necessary to use the service water in which the metal ion is not contained. Since the generation water of the metal plate type water production apparatus is not contain the metal ion, it is suitable for the dyeing work service water.

Another embodiment of the metal plate type water production apparatus of the present invention will be explained. The plant automatic water supply apparatus E shown in from FIG. 1 to FIG. 7 shows the small size production example in which the metal plate type water production apparatus of the present invention is adopted to be the home gardening use and it will be explained the examples for the commercial use, the industrial use, and the home use etc.

The metal plate type water production apparatus of the present invention will be explained with the metal plate type water production apparatus shown in FIG. 19. It adopts the metal plate (the water collection device C) having ultra sonic oscillating mechanism shown in FIG. 17 and FIG. 18. The metal plate type water production apparatus of this embodiment is the water production apparatus for extracting from the moisture in atmosphere, in the process of the linear shape increase amount (this indicates the process in which the adhesion water increases linearly the amount from the initial stage of the water film formation) of the generation water film (the adhesion water film) 241 generated by the dew which formed in the surface of the cooled water collection plate (the water collection metal device C), and before stage time of the saturation where the increase amount of the generation water film 214 (the time immediately before the gradual parabola increase), in other words, in the linearly increase amount finish stage (the linearly increase amount finish process) of the generation water film 214, using the ultra sonic vibrator 231 of the ultra sonic oscillating mechanism, the generation water film 214 is flipped off and is peeled off forcibly from the metal plate surface and is collected.

Namely, in the embodiment of the metal plate type water collection apparatus adopted the water collection metal plate (the water collection metal device C) having the ultra sonic oscillating mechanism according to the present invention, the ultra sonic vibrator 231 is operated, the ultra sonic vibration is given to the generation water film 214, and the generation water film is flipped off and peeled off forcibly from the surface of the water collection metal plate (the water collection device C) according to the minute vibration. The generation water film 214 is flipped off from the hydrophilicity face 211 of the water collection plate (the water collection metal device). The generation water film 214 is flipped off from the surface of the water collection plate (the water collection metal device) and some of the flipped-off (the flipped-out) waters are united and falls down. The water 215 is flipped off but actually is oozed out. The water 215 is collected in the inner portion of the metal plate type water production apparatus and the water 215 is extracted (water-produced) from the moisture in atmosphere.

What is claimed is:

1. In a method of producing water by extracting water from moisture in atmosphere, a metal plate type water generation method wherein by cooling a metal plate, generating a water film having a predetermined thickness on a surface of said metal plate by dew condensation, flipping off said generation water film from said metal plate, and peeling off forcibly said generation water film from said metal plate, wherein both the generation water film flipping off process and the generation water film peeling off process are performed in a linear increase amount process of said generation water film on said metal plate and at before stage time of saturation of said generation water film on said metal plate, thereby said before stage time of saturation of said generation water film is flipped off from said metal plate and is peeled off from said metal plate.

2. The metal plate type water generation method according to claim 1, the metal plate type water generation method wherein
said water generation film generated on said surface of said metal plate is flipped by a ultra sonic oscillation.

3. The metal plate type water generation method according to claim 1, the metal plate type water generation method wherein
a surface treatment processing is performed to said metal plate, thereby a hydrophilic property performance is carried out by a rough roughness performance, and said generation water film generated on said surface of said metal plate is amount-increased.

4. A method for producing water by extracting water from moisture in atmosphere, comprising:
cooling a metal plate to provide a cooled metal plate;
exposing the cooled metal plate to an atmosphere containing moisture to form a water film on a surface of the cooled metal plate by dew condensation;
determining whether a thickness the water film is in one stage of increasing linearly with the time or in another stage of reaching a saturation state thickness; and
forcibly removing the water film from the surface of the cooled metal plate prior to the thickness the water film being in the another stage of reaching a saturation state thickness.

5. The method for producing water by extracting water from moisture in atmosphere according to claim 4, wherein the water film is forcibly removed from the surface of the cooled metal plate when the thickness the water film is in the one stage of increasing linearly with time.

6. The method for producing water by extracting water from moisture in atmosphere according to claim 5, wherein the water film is forcibly removed from the surface of the cooled metal plate by flipping the water film off the cooled metal plate.

7. The method for producing water by extracting water from moisture in atmosphere according to claim 6, wherein the water film is flipped off the surface of the cooled metal plate by ultra sonic oscillation.

8. The method for producing water by extracting water from moisture in atmosphere according to claim 5, wherein the water film is forcibly removed from the surface of the cooled metal plate by peeling the water film from the surface of the cooled metal plate.

9. The method for producing water by extracting water from moisture in atmosphere according to claim 8, wherein the water film is peeled off the surface of the cooled metal plate by a wiper blade.

10. The method for producing water by extracting water from moisture in atmosphere according to claim 4, wherein the surface of the metal plate is hydrophilic.

11. An apparatus for producing water by extracting water from moisture in atmosphere, comprising:
a metal plate configured to be exposed to an atmosphere containing moisture;
a cooler for cooling the metal plate to form a water film on a surface of the metal plate by dew condensation;
a mechanism for forcibly removing the water film from the surface of the metal plate; and
a control unit configured to determine whether a thickness of the water film is in one stage of increasing linearly with time or in another stage of reaching a saturation state thickness, and to control operation of the mechanism for forcibly removing the water film from the surface of the metal plate to remove the water film from the surface of the metal plate prior to the thickness of the water film being in the another stage of reaching a saturation state thickness.

12. The apparatus for producing water by extracting water from moisture in atmosphere according to claim 11, wherein the control unit is configured to forcibly remove the water film from the surface of the metal plate when the thickness the water film is in the one stage of increasing linearly with time.

13. The apparatus for producing water by extracting water from moisture in atmosphere according to claim 12, wherein the mechanism for forcibly removing the water film from the surface of the metal plate is a mechanism for flipping the water film off the metal plate.

14. The apparatus for producing water by extracting water from moisture in atmosphere according to claim 13, wherein the mechanism for flipping the water film off the metal plate is an ultra sonic oscillator.

15. The apparatus for producing water by extracting water from moisture in atmosphere according to claim 12, wherein the mechanism for forcibly removing the water film from the surface of the metal plate is a mechanism for peeling the water film from the surface of the metal plate.

16. The apparatus for producing water by extracting water from moisture in atmosphere according to claim 15, wherein the mechanism for peeling the water film from the surface of the metal plate is a wiper blade.

17. The apparatus for producing water by extracting water from moisture in atmosphere according to claim 11, wherein the surface of the metal plate is hydrophilic.

\* \* \* \* \*